(12) United States Patent
Clark et al.

(10) Patent No.: US 6,965,668 B2
(45) Date of Patent: Nov. 15, 2005

(54) METHOD AND SYSTEM FOR PRESENTING BILLING INFORMATION ACCORDING TO A CUSTOMER-DEFINED HIERARCHAL STRUCTURE

(75) Inventors: Bonnie Clark, Danville, CA (US); Emma M. Espinoza, St. Lous, MO (US); Catherine E. Harris, Wildwood, MO (US); Margaret M. Hassel, Belleville, IL (US); Anita Elizabeth Neroda, San Ramon, CA (US); Michael Thane Paquette, Ballwin, MO (US); Danny Lee Roper, Grover, MO (US); Carolyn Marie Ukena, San Ramon, CA (US); Stephen James Votava, Des Peres, MO (US)

(73) Assignees: SBC Services, Inc., San Antonio, TX (US); Pacific Telesis Shared Services, San Francisco, CA (US); Southwestern Bell Communications Services Inc., Pleasanton, CA (US)

( * ) Notice: Subject to any disclaimer, the term of this patent is extended or adjusted under 35 U.S.C. 154(b) by 223 days.

(21) Appl. No.: 10/038,658

(22) Filed: Jan. 8, 2002

(65) Prior Publication Data

US 2003/0128828 A1 Jul. 10, 2003

(51) Int. Cl.⁷ ............................................. H04M 15/00
(52) U.S. Cl. .............. 379/116; 379/127.01; 379/114.03

(58) Field of Search ................................. 379/116, 119, 379/121.05, 127.01, 114.03, 121.01, 126, 93.12; 705/34; 709/223

(56) References Cited

U.S. PATENT DOCUMENTS

| | | | |
|---|---|---|---|
| 5,287,270 A | | 2/1994 | Hardy et al. |
| 5,325,290 A | | 6/1994 | Cauffman et al. |
| 5,943,656 A | | 8/1999 | Crooks et al. |
| 5,982,864 A | | 11/1999 | Jagadish et al. |
| 6,058,170 A | | 5/2000 | Jagadish et al. |
| 6,072,493 A | * | 6/2000 | Driskell et al. ............. 715/854 |
| 6,125,354 A | | 9/2000 | MacFarlane et al. |
| 6,282,552 B1 | | 8/2001 | Thompson et al. |
| 6,304,857 B1 | | 10/2001 | Heindel et al. |
| 6,639,975 B1 | * | 10/2003 | O'Neal et al. ......... 379/112.01 |
| 6,714,979 B1 | * | 3/2004 | Brandt et al. ............... 709/225 |

* cited by examiner

*Primary Examiner*—Binh Tieu
*Assistant Examiner*—Barry W Taylor
(74) *Attorney, Agent, or Firm*—Greenblum & Bernstein, P.L.C.

(57) ABSTRACT

A service for presenting billing information to a customer according to a hierarchal structure defined by the customer. The customer assigns telephone numbers to company units and defines how each of the units relate to each other in the hierarchal structure. The billing information associated with each assigned telephone number is processed in accordance with the hierarchal structure. Thereafter, the bill is presented to the customer.

29 Claims, 22 Drawing Sheets

HIERARCHY FOR COUNTY OF LOS ANGELES

[FIND HIERARCHY]  [FIND STATION]  CHECK IN HIERARCHY

- SELECT HIERARCHY NAME TO CONTINUE DRILLING INTO HIERARCHY.
- CHECK BOX(ES) NEXT TO HIERARCHY(S) AND THEN SELECT ACTION TO PERFORM.

| HIERARCHY - DESCRIPTION | ACTIONS |
|---|---|
| F000001 - COUNTY OF LOS ANGELES | ADD\|EDIT\|VIEW STATIONS\|MOVE\|DELETE |
| ☐ 00000 - DUMMY COUNT RECORD | ADD\|EDIT\|VIEW STATIONS\|MOVE\|DELETE |
| ☐ F014868 - SC-COMTON/COLLECTIONS CHARGE2 | ADD\|EDIT\|VIEW STATIONS\|MOVE\|DELETE |
| ☐ F015681 - LASD- SHERIFF DEPT | ADD\|EDIT\|VIEW STATIONS\|MOVE\|DELETE |
| ☐ F019050 - HUMAN RELATIONS COMMISSION | ADD\|EDIT\|VIEW STATIONS\|MOVE\|DELETE |
| ☐ F019350 - REGIONAL PLANNING COMMISSION | ADD\|EDIT\|VIEW STATIONS\|MOVE\|DELETE |
| ☐ F020600 - OFFICE OF MANAGED CARE | ADD\|EDIT\|VIEW STATIONS\|MOVE\|DELETE |
| ☐ F024006 - DHS- INGLEWOOD HLTH DIST. | ADD\|EDIT\|VIEW STATIONS\|MOVE\|DELETE |
| ☐ F024336 - PUBHLTH-WEST HEALTH DIST. | ADD\|EDIT\|VIEW STATIONS\|MOVE\|DELETE |
| ☐ F025760 - PUBHLTH-CCS/CHDP | ADD\|EDIT\|VIEW STATIONS\|MOVE\|DELETE |
| ☐ F028300 - MUSEUM OF NATURAL HISTORY | ADD\|EDIT\|VIEW STATIONS\|MOVE\|DELETE |
| ☐ F028350 - MUSIC CENTER OPERATIONS | ADD\|EDIT\|VIEW STATIONS\|MOVE\|DELETE |
| ☐ F028357 - PETERSON AUTOMOTIVE MUSEUM | ADD\|EDIT\|VIEW STATIONS\|MOVE\|DELETE |
| ☐ F029129 - SUPCT-COUNTY COURTHOUSE | ADD\|EDIT\|VIEW STATIONS\|MOVE\|DELETE |
| ☐ F029163 - SUPCT-CRIMINAL COURTS BUILDING | ADD\|EDIT\|VIEW STATIONS\|MOVE\|DELETE |
| ☐ F029341 - SUPCT-SOUTHBAY COURTHOUSE | ADD\|EDIT\|VIEW STATIONS\|MOVE\|DELETE |
| ☐ F029410 - SC-PALMDALE COURT | ADD\|EDIT\|VIEW STATIONS\|MOVE\|DELETE |
| ☐ F041059 - BOS-CABLE-TV FRANCHISE | ADD\|EDIT\|VIEW STATIONS\|MOVE\|DELETE |

©2001 SBC ALL RIGHTS RESERVED.
PRIVACY POLICY

FIG. 11

HIERARCHY PATH:
TOP OF REPORT -> 1000000 - COMPANY ROOT -> 1000002 - PRODUCTS

REPORT DATE: JUNE 26, 2001

BILL AT A GLANCE
SUMMARY REPORT
1000000 - COMPANY ROOT

|◁ ◁PAGE 1 OF 2▷ ▷| GO TO PAGE: [  ] GO

BILLING ANALYSIS

[PRINTER VERSION]
[DOWNLOAD REPORT]
[CUSTOMIZE REPORT]

JUMP TO: BILL MONTH: [OCT-2000 ▽] BILL DAY: [ALL ▽]

| BILL DATE | HIERARCHY NAME | MONTHLY SERVICE CHARGES | TOTAL USAGE | ADDS AND CHANGES | OTHER CHARGES | TAXES AND SURCHARGES | DIRECTORY ASSISTANCE | PAYMENTS CREDITS AND ADJUSTMENTS | TOTAL CHARGES |
|---|---|---|---|---|---|---|---|---|---|
| OCT-1999 | 1000000 - COMPANY ROOT | $479,894.67 | $28.06 | ($12,293.53) | $346,590.31 | $68,343.92 | $23.00 | $39,287.80 | $921,851.23 |
| NOV-1999 | 1000000 - COMPANY ROOT | $482,520.57 | $117.20 | $22,062.96 | $219,535.62 | $114,745.58 | $31.00 | $25,407.34 | $864,389.27 |
| DEC-1999 | 1000000 - COMPANY ROOT | $639,884.01 | $47,484.00 | ($27,444.57) | $220,673.90 | $112,627.37 | $32.00 | $17,235.55 | $1,010,460.26 |
| JAN-2000 | 1000000 - COMPANY ROOT | $646,947.09 | $40,637.96 | $27,443.82 | $192,043.69 | $108,814.63 | $30.00 | $10,694.21 | $1,026,581.40 |
| FEB-2000 | 1000000 - COMPANY ROOT | $669,864.30 | $51,467.16 | $97,309.57 | $188,895.64 | $108,780.92 | $32.00 | $5,355.40 | $1,121,672.99 |
| MAR-2000 | 1000000 - COMPANY ROOT | $360,619.73 | $23,325.34 | $41,562.12 | $101,844.03 | $52,986.49 | $36.00 | $617.34 | $580,955.05 |
| APR-2000 | 1000000 - COMPANY ROOT | $362,517.40 | $22,735.29 | $21,915.78 | $102,136.22 | $52,031.59 | $36.00 | $757.55 | $562,093.83 |
| MAY-2000 | 1000000 - COMPANY ROOT | $362,382.22 | $20,273.01 | $24,413.31 | $83,798.90 | $48,604.11 | $36.00 | $1061.92 | $540,533.47 |
| JUN-2000 | 1000000 - COMPANY ROOT | $373,721.52 | $18,735.93 | $32,889.75 | $89,700.39 | $49,778.50 | $37.00 | $2386.47 | $567,222.56 |
| JUL-2000 | 1000000 - COMPANY ROOT | $374,576.53 | $12,975.51 | $2,128.72 | $81,742.75 | $48,162.20 | $35.00 | $3,303.81 | $522,889.52 |
| PAGE TOTAL: | | $4,752,928.04 | $237,779.46 | $229,997.33 | $1,626,961.45 | $764,875.31 | $328.00 | $106,107.39 | $7,718,649.58 |

|◁ ◁PAGE 1 OF 2▷ ▷| GO TO PAGE: [  ] GO

©2001 SBC ALL RIGHTS RESERVED.
PRIVACY POLICY

[BACK TO REPORTS] [HELP] [LOGOUT]

STANDARD REPORTS

COMPANY ROOT(10000)

BILLING ANALYSIS

HOME | REPORTS | ADMINISTRATION

REPORT DATE: OCTOBER 2,2001 — 231

MONTHLY SERVICE CHARGES
SUMMARY REPORT
10000 - COMPANY ROOT
— 222

| HIERARCHY NAME | TOTAL CHARGES |
|---|---|
| COMPANY ROOT(STN) | $0.00 |
| ACCOUNTING DEPT. | $16.76 |
| BILLING DEPT. | $422.47 |
| HR DEPT. | $38.46 |
| IT DEPT. | $350.50 |
| LEGAL DEPT. | $191.62 |
| MARKETING DEPT. | $100.56 |
| | $1,120.37 |

| BILL DATE | |
|---|---|
| AUG 2000 | |
| AUG 2000 | |
| AUG 2000 | |
| AUG 2000 | |
| AUG 2000 | |
| AUG 2000 | |
| TOTAL: | |

LOGOUT  HELP

©2001 SBC ALL RIGHTS RESERVED.
PRIVACY POLICY

COMPANY ROOT(10000)>IT DEPT.(14000)>DESKTOP SERVICES(14100)  REPORT DATE: OCTOBER 2,2001

MONTHLY SERVICE DETAIL
REPORT
14100 - DESKTOP SERVICES(STN)

BILL MONTH:  BILL DAY:
AUG - 2000    ALL

◁ PAGE 1 OF 2 ▷ ⊠

STATION NUMBER: 310-547-0282
SERVICE ADDRESS: 26607 S WESTERN AV LOMITA, CA

| PROVIDER | DESCRIPTION | USOC | ACTIVITY DATE | RATE | QUANTITY | CHARGE |
|---|---|---|---|---|---|---|
| PB | MEASURED RATE BUSINESS SVC WITH TOLL RESTRICTION | 1MBTS | 03-13-00 | $9.80 | 1.0 | $9.80 |
| PB | MULTI LINE BUSINESS NO INTER EXCHANGE CARRIER CHARGE | 9PCC4 | 03-13-00 | $0.00 | 1.0 | $0.00 |
| PB | ACCESS FOR INTERSTATE CALLING MULTI LINE BUSINESS | 9ZEU4 | 03-13-00 | $4.44 | 1.0 | $4.44 |
| PB | CONTRACTED DATES: | CDATE | 05-16-00 | $0.00 | 1.0 | $0.00 |
| PB | 900/976 BLOCKING | CL1 | 03-13-00 | $0.00 | 1.0 | $0.00 |
| PB | TEL. NUMBER COMPLETE BLOCKING | CNMBK | 03-13-00 | $0.00 | 1.0 | $0.00 |
| PB | YOUR LISTING IS NOT PUBLISHED | NPU | 03-13-00 | $0.28 | 1.0 | $0.28 |
| PB | NUMBER PORTABILITY SVC CHARGE | NSR | 03-13-00 | $0.34 | 1.0 | $0.34 |
| PB | CONTRACT - USAGE DISCOUNT RATE | RTM | 05-16-00 | $0.00 | 1.0 | $0.00 |
| PB | TOLL BLOCKING | TRS | 03-13-00 | $1.90 | 1.0 | $1.90 |

SUBTOTAL $16.76

STATION NUMBER: 310-547-0597
SERVICE ADDRESS: 26607 S WESTERN AV LOMITA, CA

| PROVIDER | DESCRIPTION | USOC | ACTIVITY DATE | RATE | QUANTITY | CHARGE |
|---|---|---|---|---|---|---|
| PB | MEASURED RATE BUSINESS SVC WITH TOLL RESTRICTION | 1MBTS | 03-13-00 | $9.80 | 1.0 | $9.80 |
| PB | MULTI LINE BUSINESS NO INTER EXCHANGE CARRIER CHARGE | 9PCC4 | 03-13-00 | $0.00 | 1.0 | $0.00 |
| PB | ACCESS FOR INTERSTATE CALLING MULTI LINE BUSINESS | 9ZEU4 | 03-13-00 | $4.44 | 1.0 | $4.44 |

©2001 SBC ALL RIGHTS RESERVED.
PRIVACY POLICY

FIG. 19

AUGUST- SUMMARY ONLY  
NO HIERARCHY

ANHEUSER BUSCH  
NADA MILLER  
SUITE 1300  
ONE BUSCH PLACE  
SAINT LOUIS, MO 63118-1300

PAGE 2 OF 2  
CUSTOMER ID 0123456789  
BILL ID 000001  
BILLING DATE DEC 19, 2001

| ACCOUNT SUMMARY | | MONTHLY CHARGES | USAGE | OTHER CHARGES AND CREDITS | TAXES AND SURCHARGES | TOTAL |
|---|---|---|---|---|---|---|
| ANHEUSER BUSCH | | | | | | |
| 314 230-3000 | SBCASI | | | 7,892.50 | | 7,892.50 |
| 314 230-4040 | CINGULAR | | | 1,127.50 | | 1,127.50 |
| 314 231-5000 | SWBELL LD | | | 4,291.65 | | 4,291.65 |
| 314 235-1234 | SWBELL LD | | | 3,289.00 | | 3,289.00 |
| 314 235-1234 | SWBELL TEL | 50.00 | 350.00 | 1,000.00 | 140.00 | 1,540.00 |
| 314 235-1237 | SWBELL LD | | | 3,784.00 | | 3,784.00 |
| 314 235-1237 | SWBELL TEL | 50.00 | 275.00 | 1,035.00 | 136.00 | 1,496.00 |
| 314 235-4500 | SWBELL LD | | | 3,344.00 | | 3,344.00 |
| 314 235-4500 | SWBELL TEL | 50.00 | 200.00 | 1,125.00 | 137.50 | 1,512.50 |
| 314 235-5000 | SWBELL TEL | 50.00 | 800.00 | 1,450.00 | 230.00 | 2,530.00 |
| 314 235-5478 | SWBELL LD | | | 484.00 | | 484.00 |
| 314 235-5478 | SWBELL TEL | 50.00 | 80.00 | 1,075.00 | 120.50 | 1,325.50 |
| 314 235-5479 | SWBELL LD | | | 4,455.00 | | 4,455.00 |
| 314 235-5479 | SWBELL TEL | 50.00 | 250.00 | 1,000.00 | 130.00 | 1,430.00 |
| 314 878-7273 | SWBELL LD | | | 594.00 | | 594.00 |
| 314 878-7273 | SWBELL TEL | 50.00 | 150.00 | 1,075.00 | 127.50 | 1,402.50 |
| 314 878-8799 | SWBELL LD | | | 528.00 | | 528.00 |
| 314 878-8799 | SWBELL TEL | 50.00 | 300.00 | 1,035.00 | 138.50 | 1,523.50 |
| 314 889-5621 | SWBELL LD | | | 1,199.00 | | 1,199.00 |
| 314 889-5621 | SWBELL TEL | 50.00 | 850.00 | 1,335.00 | 223.50 | 2,458.50 |
| 925 244-4250 | MCI | | | 2,821.50 | | 2,821.50 |
| 925 244-4250 | PACBELL | 50.00 | 400.00 | 1,020.00 | 147.00 | 1,617.00 |
| 925 244-5050 | MCI | | | 2,805.00 | | 2,805.00 |
| 925 244-5050 | PACBELL | 50.00 | 300.00 | 1,075.00 | 142.50 | 1,567.50 |
| 925 244-7100 | MCI | | | 4,933.50 | | 4,933.50 |
| 925 244-7100 | PACBELL | 50.00 | 250.00 | 1,035.00 | 133.50 | 1,468.50 |
| 925 277-4000 | MCI | | | 4,427.50 | | 4,427.50 |
| 925 277-4000 | PACBELL | 50.00 | 200.00 | 1,000.00 | 125.00 | 1,375.00 |
| 925 277-4025 | MCI | | | 3,382.50 | | 3,382.50 |
| 925 277-4025 | PACBELL | 50.00 | 300.00 | 1,000.00 | 135.00 | 1,485.00 |
| 925 277-5000 | MCI | | | 4,757.50 | | 4,757.50 |
| 925 277-5000 | PACBELL | 50.00 | 435.00 | 1,125.00 | 161.00 | 1,771.00 |
| 925 866-6000 | MCI | | | 4,966.50 | | 4,966.50 |
| 925 866-6000 | PACBELL | 50.00 | 575.00 | 1,000.00 | 162.50 | 1,787.50 |
| 925 867-3002 | MCI | | | 3,360.50 | | 3,360.50 |
| 925 867-3002 | PACBELL | 50.00 | 225.00 | 1,045.00 | 132.00 | 1,452.00 |
| 925 867-5478 | MCI | | | 3,162.50 | | 3,162.50 |
| 925 867-5478 | PACBELL | 50.00 | 100.00 | 1,000.00 | 115.00 | 1,265.00 |
| 925 867-6250 | MCI | | | 4,097.50 | | 4,097.50 |
| 925 867-6250 | PACBELL | 50.00 | 80.00 | 1,025.00 | 115.50 | 1,270.50 |
| 999999999999991 | SWBELL IS | | | 1,276.00 | | 1,276.00 |
| 999999999999991 | SWBELL TEL | 500.00 | 53,200.00 | 5,900.00 | 5960.00 | 65,560.00 |
| TOTALS FOR ANHEUSER BUSCH | | 1,450.00 | 59,320.00 | 97,334.15 | 8,712.50 | 166,816.65 |

FIG. 20

AUGUST- SUMMARY ONLY
WITH HIERARCHY

ANHEUSER BUSCH
NADA MILLER
SUITE 1300
ONE BUSCH PLACE
SAINT LOUIS, MO 63118-1300

PAGE 2 OF 2
CUSTOMER ID 0123456789
BILL ID 000001
BILLING DATE DEC 19, 2001

ACCOUNT SUMMARY

| | | 261 | 254 HIERARCHY TOTAL | MONTHLY CHARGES | 255 USAGE | 256 OTHER CHANGES AND CREDITS | 257 TAXES AND SURCHARGES | 258 TOTAL |
|---|---|---|---|---|---|---|---|---|
| ANHEUSER BUSCH — 251 | | | | | | | | |
| MISSOURI | | | | | | | | |
| 262 | 314 230-3000 | SBCASI | | | | 7,892.50 | | 7,892.50 |
| | 314 230-4040 | CINGULAR | | | | 1,127.50 | | 1,127.50 |
| | 314 231-5000 | SWBELL LD | | | | 4,291.65 | | 4,291.65 |
| | 314 231-5000 | SWBELL TEL | | 50.00 | 800.00 | 1,450.00 | 230.00 | 4,291.65 |
| | 9999999999999991 | SWBELL IS | | | | 1,276.00 | | 1,276.00 |
| | 9999999999999991 | SWBELL TEL | | 500.00 | 53,200.00 | 5,900.00 | 5960.00 | 65,560.00 |
| ST.LOUIS — 264 | | | 30,365.50 | | | | | |
| BREWING — 266 | | | 25,509.00 | | | | | |
| SPECIALTY BEERS — 268 | | | 17,803.50 | | | | | |
| CROW — 270 | | | 10,109.00 | | | | | |
| 280 — 314 235-1234 | SWBELL LD | | | | | 3,289.00 | | 3,289.00 |
| 314 235-1234 | SWBELL TEL | | | 50.00 | 350.00 | 1,000.00 | 140.00 | 1,540.00 |
| 314 235-1237 | SWBELL LD | | | | | 3,784.00 | | 3,784.00 |
| 314 235-1237 | SWBELL TEL | | | 50.00 | 275.00 | 1,035.00 | 136.00 | 1,496.00 |
| HOLDER — 271 | | | 7,694.50 | | | | | |
| 314 235-5478 | SWBELL LD | | | | | 484.00 | | 484.00 |
| 314 235-5478 | SWBELL TEL | | | 50.00 | 80.00 | 1,075.00 | 120.50 | 1,325.50 |
| 314 235-5479 | SWBELL LD | | | | | 4,455.00 | | 4,455.00 |
| 314 235-5479 | SWBELL TEL | | | 50.00 | 250.00 | 1,000.00 | 130.00 | 1,430.00 |
| REGULAR BEER — 269 | | | 7,705.50 | | | | | |
| SCHWARZ | | | 4,4048.00 | | | | | |
| 314 878-7273 | SWBELL LD | | | | | 594.00 | | 594.00 |
| 314 878-7273 | SWBELL TEL | | | 50.00 | 150.00 | 1,075.00 | 127.50 | 1,402.50 |
| 314 878-8799 | SWBELL LD | | | | | 528.00 | | 528.00 |
| 314 878-8799 | SWBELL TEL | | | 50.00 | 300.00 | 1,035.00 | 138.50 | 1,523.50 |

FIG. 21-1

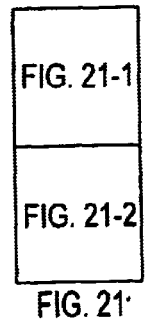

FIG. 21

| | | | | | | |
|---|---|---|---|---|---|---|
| WASSER | | 3,657.50 | | | | |
| 314 889-5621 SWBELL LD | | | | 1,199.00 | | 1,199.00 |
| 314 889-5621 SWBELL TEL | | | 50.00 850.00 | 1,335.00 | 223.50 | 2,458.50 |
| DISTRIBUTION —267 | | 4,856.50 | | | | |
| 314 235-4500 SWBELL LD | | | | 3,344.00 | | 3,344.00 |
| 314 235-4500 SWBELL TEL | | | 50.00 200.00 | 1,125.00 | 137.50 | 1,512.50 |
| CALIFORNIA —263 | | 53,773.50 | | | | |
| SAN RAMON —265 | | 53,773.50 | | | | |
| 925 867-3002 MCI | | | | 3,360.50 | | 3,360.50 |
| 925 867-3002 PAC BELL | | | 50.00 225.00 | 1,045.00 | 132.00 | 1,452.00 |
| BREWING —266 | | 42,207.00 | | | | |
| SPECIALTY BEERS —268 | | 16,324.00 | | | | |
| 925 277-5000 MCI | | | | 4,757.50 | | 4,757.50 |
| 925 277-5000 PAC BELL | | | 50.00 435.00 | 1,125.00 | 161.00 | 1,771.00 |
| KEMP —272 | | 9,795.50 | | | | |
| 925 867-5478 MCI | | | | 3,162.50 | | 3,162.50 |
| 925 867-5478 PAC BELL | | | 50.00 100.00 | 1,000.00 | 115.00 | 1,265.00 |
| 925 867-6250 MCI | | | | 4,097.50 | | 4,097.50 |
| 925 867-6250 PAC BELL | | | 50.00 80.00 | 1,025.00 | 115.50 | 1,270.50 |
| REGULAR BEER —269 | | 25,883.00 | | | | |
| LUCIER | | 10,670.00 | | | | |
| 925 277-4000 MCI | | | | 4,427.50 | | 4,427.50 |
| 925 277-4000 PAC BELL | | | 50.00 200.00 | 1,000.00 | 125.00 | 1,375.00 |
| 925 277-4025 MCI | | | | 3,382.50 | | 3,382.50 |
| 925 277-4025 PAC BELL | | | 50.00 300.00 | 1,000.00 | 135.00 | 1,485.00 |
| TOWNZEN | | 15,213.00 | | | | |
| 925 244-4250 MCI | | | | 2,821.50 | | 2,821.50 |
| 925 244-4250 PAC BELL | | | 50.00 400.00 | 1,020.00 | 147.00 | 1,617.00 |
| 925 244-5050 MCI | | | | 2,805.00 | | 2,805.00 |
| 925 244-5050 PAC BELL | | | 50.00 300.00 | 1,075.00 | 142.50 | 1,567.50 |

FIG. 21-2

METHOD AND SYSTEM FOR PRESENTING BILLING INFORMATION ACCORDING TO A CUSTOMER-DEFINED HIERARCHAL STRUCTURE

BACKGROUND OF THE INVENTION

1. Field of the Invention

The present invention relates to the field of telecommunications. More particularly, the present invention relates to a method and system for presenting billing information to a customer in accordance with a hierarchal structure defined by the customer.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Acronyms

The written description provided herein contains acronyms that refer to various telecommunications services, components and techniques, as well as features relating to the present invention. Although some of these acronyms are known, use of these acronyms is not strictly standardized in the art. For purposes of the written description herein, acronyms will be defined as follows:

Account Management (AM)
Accounts Payable (A/P)
Accounts Receivable (A/R)
Billing Account Number (BAN)
Billing Data Repository (BDR)
Billing Pilot Project 2 (BPP2)
Billing Telephone Number (BTN)
Business Information Manager (BIM)
Convergent Bill (CB)
Customer Account Payment Management (CAPM)
Electronic Billing Analysis Tool (eBAT)
Enterprise Billing Pilot Project 2 (E-BPP2)
Input Interface Record (IIR)
Input Interface Record Create Unit (ICU)
Working Telephone Number (WTN)

3. Description of Background Information

Corporations typically receive large telephone bills for charges incurred by their personnel from various departments and divisions. Large corporations have hundreds of departments and divisions that may be located in numerous cities. Further, some customers are serviced by more than one telecommunications carrier and as a result receive multiple bills. Consequently, the functions of auditing and monitoring telephone charges can be challenging.

Known telephone billing systems offer customers very little flexibility in terms of how the data is presented and how it may be managed and manipulated. Customers would appreciate the option of defining the structure of their telephone bill in advance so that the arrangement of their bill meets the needs of the company. For instance, the customer may define the format of their bill according to company specific criteria, such as internal processes, business structure, geographic location, etc. Similarly, customers would like to be able to view charges by employee, by department, or by any other unit.

A single bill including all of the customer's telecommunications charges and presented according to the customer's criteria would provide invaluable assistance to corporate personnel responsible for the auditing, management, and fiscal oversight functions of the company.

The prior art is deficient in this area. The present invention overcomes the problems associated with the prior art.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 11 shows an exemplary eBAT web page displayed to a customer when the hierarchy name of a root node is selected to display child nodes in the hierarchy, when the hierarchy is checked out;

FIG. 17 shows an exemplary bill at a glance summary report eBAT web page;

FIG. 18 shows an exemplary monthly service charges summary report eBAT web page;

FIG. 19 shows an exemplary monthly service detail report eBAT web page;

FIG. 20 shows an exemplary CB account summary excerpt not formatted in accordance with a customer's hierarchy; and FIG. 21 shows an exemplary CB account summary excerpt formatted in accordance with a customer's hierarchy.

DETAILED DESCRIPTION OF THE EMBODIMENTS

Figure 1:
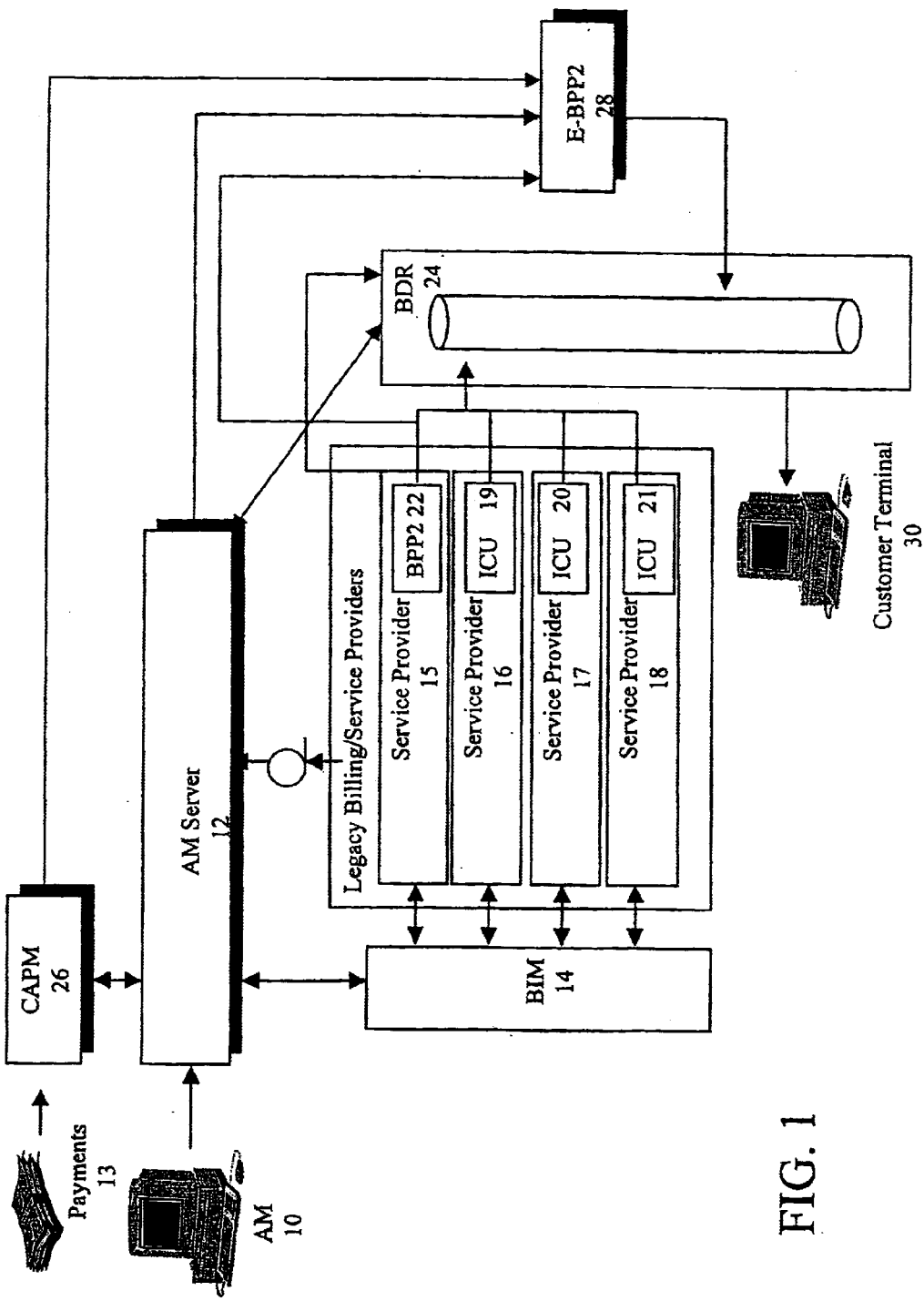
FIG. 1 is an exemplary functional block diagram of a billing system, according to an aspect of the present invention.

In view of the foregoing, the present invention, through one or more of its various aspects and/or embodiments is thus presented to enable a telecommunications carrier to provide a single bill in accordance with a customer's pre-defined format and to allow the customer to update the format as required.

Accordingly, one aspect of the invention is to provide a method of providing billing information to a customer in accordance with a customer-defined format in a telecommunications billing system. The method includes assigning telephone numbers to company units, defining how each of the company units relate to each other in a hierarchy, storing the hierarchy in a database, processing the billing information associated with each assigned telephone number in accordance with the hierarchy, and presenting the processed billing information to the customer.

The hierarchy may be organized according to corporate structure and/or geographical location of the company units. Further, the customer-defined format may include customer-defined labels.

Another aspect of the invention is to provide a method of providing a bill in accordance with a customer-defined format in a telecommunications billing system. The method includes retrieving billing information from a billing repository, processing the billing information in accordance with the customer-defined format stored in a database, sending the processed billing information to an outputting operation where a bill is generated in accordance with the hierarchy, and sending the bill to a customer.

The hierarchy may be organized according to corporate structure and/or geographical location of the company units. The customer-defined format may further include customer-defined labels.

Another aspect of the invention is to provide a method of enabling a customer to create a hierarchal structure to support internal company criteria in an electronic billing system. The method includes enabling the customer to assign telephone numbers to company units and enabling the customer to define how each of the company units relate to each other in a hierarchy. The method further includes storing the hierarchy in a database and enabling the customer to view billing information associated with selected portions of the hierarchy.

The method may include enabling the customer to update the assignments of telephone numbers to company units. The method may also include enabling the customer to update the definition of how each of the company units relate to each other in the hierarchy. A company unit displayed in the viewed billing information may contain a hyperlink to billing information associated with a child node in the hierarchy. Further, a charge displayed in a column of a summary billing report may contain a hyperlink to a detailed billing report associated with the charge.

The hierarchy may be organized according to corporate structure and/or geographical location of the company units. The method may allow the customer to set permissions that determine access rights to billing information. A permission may be set to determine access to a specific level of the hierarchy. The hierarchal structure may include a customer-defined format with customer-defined labels.

Another aspect of the invention is to provide a method of creating a hierarchal structure to support a customer's internal company criteria in an electronic billing system. The method includes assigning telephone numbers to company units according to the customer's internal company criteria and defining how each of the company units relate to each other in a hierarchy in accordance with the customer's request. The method further includes storing the hierarchy in a database and enabling the customer to view billing information associated with selected portions of the hierarchy.

The method may include enabling the customer to update the assignments of telephone numbers to company units. The method may also include enabling the customer to update the definition of how each of the company units relate to each other in the hierarchy.

A company unit displayed in the viewed billing information may contain a hyperlink to billing information associated with a child node in the hierarchy. A charge displayed in a column of a summary billing report may contain a hyperlink to a detailed billing report associated with the charge.

The hierarchy may be organized according to corporate structure and/or geographical location of the company units. The customer may set permissions that determine access rights to billing information. A permission may be set to determine access to a specific level of the hierarchy. The hierarchal structure may include a customer-defined format with customer-defined labels.

Another aspect of the invention is to provide a system for creating a billing statement according to a customer-defined hierarchal structure. The system includes a server that stores a customer hierarchy, in which the hierarchy includes an assignment of telephone numbers to company units and an indication of how each of the company units relate to each other. A processor is included that processes billing information associated with each assigned telephone number in accordance with the hierarchy. A component is also included that presents the processed billing information to the customer.

The server may receive and store updated hierarchal information from the customer, in which the updating of the hierarchal information does not affect upstream billing systems. The server may also receive and store permissions from the customer that determine access rights to billing information. The customer-defined hierarchal structure includes a customer-defined format that includes customer-defined labels.

Another aspect of the invention is to provide a computer readable medium for storing a computer program that displays electronic billing information to a customer. The computer readable medium includes a receiving source code segment that receives a hierarchy defined by a customer, in which the hierarchy includes an assignment of telephone numbers to company units and an indication of how each of the company units relate to each other. The computer readable medium also includes a storing source code segment that stores the hierarchy, a processing source code segment that processes the billing information associated with each assigned telephone number in accordance with the hierarchy, and a presenting source code segment that presents the billing information to the customer. The hierarchy may further include a customer-defined format that includes customer-defined labels.

The present invention is a method and system for presenting billing information according to a hierarchal structure defined by a customer and permitting the customer to update the hierarchal structure. The customer may define the presentation of billing information according to the organization's internal processes, business structure, geographic location, etc. Essentially, the customer may define a hierarchy to better align billing information to the organizational structure, regardless of billing telephone number (BTN), billing account number (BAN), working telephone number (WTN), geography, or class of service. Levels within the hierarchy are populated with related groups of data.

Thus, customers are able to view charges by employee, by department, or by any other unit in a manner that makes sense to the company. As a result, charges may be readily reviewed for approval or auditing.

In one embodiment of the invention, the customer may receive a convergent bill (CB) in hard copy (i.e., paper) or in an alternative media format such as a cd-rom or other electronic format. The CB presents billing information in accordance with the customer's pre-defined hierarchy. In another embodiment of the invention, the customer may view canned or custom billing reports via the Internet using an electronic billing analysis tool (eBAT). The reports present billing information in accordance with the customer's pre-defined hierarchy.

With respect to the eBAT, the customer may also provision security measures to protect the data, such as configuring permissions to grant or deny access to portions of the billing information by certain persons or entities at any level of the hierarchy. Further, the customer may use the eBAT to provision their hierarchy, update hierarchal information, change or set passwords, add or delete users, retrieve messages, make payments, etc. at a time convenient to the customer. Changes made by the customer to the hierarchy are reflected in the following month's bill.

The present invention also provides for the display of billing information generated from multiple telecommunications carriers, each having a distinct billing system, i.e., upstream billing system. Advantageously, changes made to the hierarchy by the customer do not impact the upstream billing systems. That is, customers may move BTNs and/or WTNs, for instance, across a hierarchy without affecting the upstream billing systems.

FIG. 1 is an exemplary functional block diagram of a billing system, according to an aspect of the present invention.

The system includes an account management (AM) client 10, an AM server 12, a business information manager (BIM) 14, a plurality of service providers 15, 16, 17, 18, input interface record create units (ICUs) 19, 20, 21, a billing pilot project 2 unit (BPP2) 22, a billing data repository (BDR) 24, a customer account payment management (CAPM) system 26, an enterprise E-BPP2 formatting engine 28, and a customer terminal 30.

The AM client 10 is a computer operated by a telecommunications carrier to communicate with the AM server 12. The telecommunications carrier uses the AM client 10 to initially provision a customer's account, including setting up the account and loading a hierarchy as defined by the customer. More specifically, provisioning the customer's account entails associating all of the customer's BTNs in the hierarchy as specified by the customer. Data from the AM client 10 is transmitted to the AM server 12 using a communications package such as Orbix by IONA Technologies. The AM client 10 runs software coded in Java provided by Sun Microsystems and the Microsoft Windows NT operating system.

The AM server 12 receives and stores data received from the AM client 10 including the customer hierarchy, as previously discussed. The AM server 12 also notifies the BIM 14 of which accounts should be marked as CB accounts and which accounts should be marked as eBAT accounts. Additionally, the AM server 12 communicates with the BDR 24 to advise the BDR 24 to make customer information available for the basis of a reporting hierarchy for CB and eBAT accounts. The AM server 12 processes service order update feeds from each of the service providers 15, 16, 17, 18 and subsequently notifies the BDR 24 of any changes requested by the customer.

Further, the AM server 12 stores customer information including e-mail addresses, user IDs, and passwords and identifies accounts to be billed and processes payments 13 received from the CAPM 26. The AM server 12 extracts billing information off the BDR 24 to support the format of the bill in accordance with the customer-defined hierarchy. As a result, the AM server 12 creates the format of the bill and extracts triggers to the E-BPP2 28. The triggers serve as a notification of a bill date for a particular customer, at the conclusion of the customer's billing cycle. For customer closing an account, the trigger indicates that bill date is the final bill for that customer. The AM server 12 runs software coded in Cobol and IBM DB2 on an IBM OS390 platform.

The BIM 14 serves as the interface between the AM server 12 and the service providers 15, 16, 17, 18. Essentially, the BIM 14 advises each of the service providers 15, 16, 17, 18 which customer accounts are CB accounts and which are eBAT accounts, indicating that information regarding those accounts will be reported in accordance with a customer defined hierarchy. Additionally, the BIM 14 and AM server 12 exchange account level information regarding BTNs. In this regard, the BIM 14 receives data from the AM server 12 in a standard format and translates the received data in accordance with the requirements of the recipient, i.e., one of the service providers 15, 16, 17, 18. Additionally, data received from one of the service providers 15, 16, 17, 18 is translated into a standard format at the BIM 14 so that the data may be sent to the AM server 12. The BIM 14 runs software coded in Java provided by Sun Microsystems on a Unix platform.

Each of the service providers 15, 16, 17, 18 has their own billing systems that may process and store data in different formats (i.e., upstream billing systems). Notwithstanding, each of the service providers 15, 16, 17, 18 may be owned by the telecommunications carrier responsible for administering CB or eBAT. In response to notification from the BIM 14, each of the service providers 15, 16, 17, 18 marks CB and eBAT customer accounts indicating that the billing records of those customers will be processed according to CB or eBAT requirements. The service providers 15, 16, 17, 18 also furnish customer order activity information to the AM server 12. Servers (not shown) at the service providers run software coded in Cobol and IBM DB2 or IBM IMS on IBM OS390 platforms.

As shown in FIG. 1, service providers 16, 17, 18 use ICUs 19, 20, 21 and service provider 15 uses BPP2 22. The ICUs 19, 20, 21 translate service provider billing data into a standard enterprise input interface record (IIR) format and route the bill (i.e., a file) to the BDR 24. The ICUs 19, 20, 21 run software coded in Cobol on an IBM OS390 platform. The BPP2 22 creates IIRs directly by virtue of embedded software run by the service provider and routes the data to the BDR. Thus, the service provider 15, 16, 17, 18 data is received in a homogeneous format, i.e., IIR.

The BDR 24 receives, validates, and audits the IIR data received from each of the service providers 15, 16, 17, 18.

Additionally, the BDR 24 makes available all billing data relating to accounts for CB and the eBAT, where the hierarchy is applied to the data. The BDR 24 runs software coded in Cobol on a Teradata platform.

The CAPM 26 processes payments 13 from all of the affiliates of the telecommunications carrier and provides payment information to the appropriate billing systems of the service providers 15, 16, 17, 18 and the E-BPP2 28. The CAPM 26 runs software coded in Cobol and IBM DB2 on Unix and IBM OS390 platforms.

The E-BPP2 28 prepares and provides raw data to the BDR 24. Specifically, the E-BPP2 28 is a formatting engine that consolidates all of the billing charges from service providers 15, 16, 17, 18 into a set of entries used to create a single bill and outputs a file for storage at the BDR 24. The file includes attributes identifying whether the bill is an eBAT or CB account.

Additionally, the E-BPP2 28 provides billing information to a bill inquiry on demand feature (not shown) so that customers may remotely view actual bills rather than billing reports via the customer terminal 30 or receiving a CB. The E-BPP2 28 runs software coded in Cobol and IBM DB2 on an IBM OS390 platform.

In practice, a corporate customer with affiliate offices in various geographic may be serviced by multiple service providers, i.e., telecommunications carriers. Alternatively, a corporate customer in a single location may be serviced by more than one telecommunications carrier. In any event, the corporate customer serviced by multiple service providers would ordinarily receive a telecommunications bill from each service provider. Under the present system, the billing information of each service provider would be converted into a homogeneous format and stored at the BDR 24. Once the data is stored at the BDR 24, the bill is generated as a CB in accordance with the customer's hierarchy. Alternatively, eBAT customers may access their billing data via the Internet using the customer terminal 30. Optionally, software resident on the client terminal 30 can communicate with the BDR 24 to apply the customer hierarchy to billing information.

When a customer subscribes to CB or eBAT, the customer's hierarchy information must be provisioned. For CB, the customer requests that the telecommunications carrier set up the hierarchy according to the customer's specifications. That is, the customer would provide the necessary information to the carrier that would allow the carrier to configure the customer's hierarchy. As a result, the telecommunications carrier would provision the customer's hierarchy during an initial load using the AM 10. The same holds true for eBAT customers. However, eBAT customers could also provision their own initial hierarchy information from the customer terminal 30, in which case the data is transmitted to and stored on the AM server 12.

Also during the initial load, a customer may also define their own billing period according to the internal needs of the company, rather than accepting the telecommunications carrier's default billing period. Further, the customer may identify and select the recipients of the company's bills.

Figure 2:
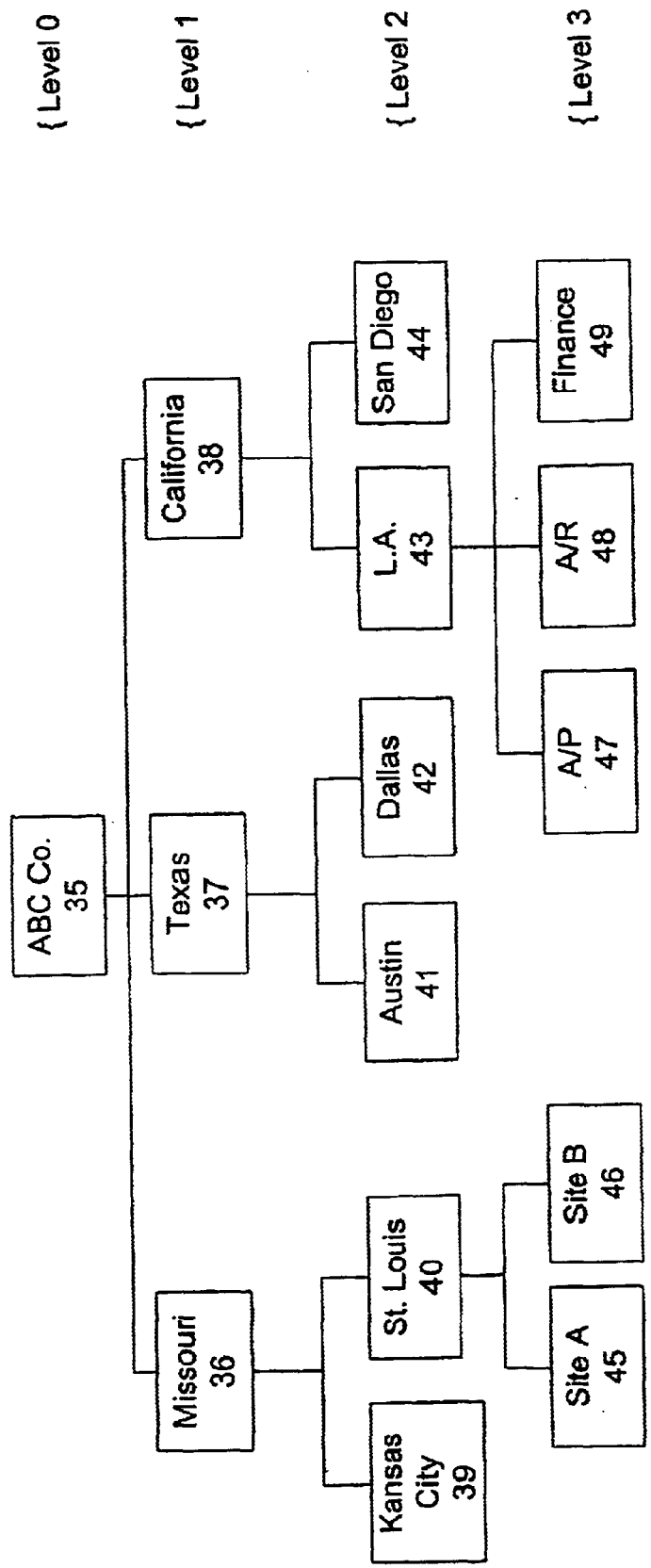
FIG. 2 is an exemplary hierarchy of a sample company, according to an aspect of the present invention.

FIG. 2 illustrates an exemplary hierarchy of a sample company. The hierarchy is essentially a tree data structure that comprises a finite set of nodes as defined by the customer. At this point, a brief discussion of a tree data structure is appropriate. The node at the top of the diagram is the root, under which there are child nodes. That is, a parent of any given node is the node linked immediately above it. Two or more nodes are sibling nodes provided they have the same parent. Further, any node in the tree can be viewed as the root of a smaller tree called a subtree, provided that there is at least one node linked below it.

Level 0 consists of a node 35 at the top of the diagram (i.e., the root) and identifies the name of the company, e.g., ABC Co. Level 1 of the hierarchy contains nodes 36, 37, 38 consisting of the names of states in which the ABC Co. has offices. Specifically, the nodes of level 1 represent the states of Missouri 36, Texas 37, and California 38. Level 2 of the hierarchy contains nodes 39, 40, 41, 42, 43, 44 consisting of the names of cities, in each of the aforementioned states, where the ABC Co. has offices. In particular, a Missouri subtree contains a Kansas City node 39 and a St. Louis node 40. Similarly, a Texas subtree contains an Austin node 41 and a Dallas node 42. Lastly, a California subtree contains a Los Angeles (L.A.) node 43 and a San Diego node 44.

Level 3 of the hierarchy contains nodes 45, 46, 47, 48, 49 consisting of two office sites in St. Louis and three corporate departments in Los Angeles. More precisely, the St. Louis subtree includes two sibling nodes representing Site A 45 and Site B 46 in the city of St. Louis. For instance, Site A 45 may be a warehouse and Site B 46 may be a distributions center. An L.A. subtree includes three sibling nodes representing corporate departments within the L.A. facility, i.e, Accounts Payable (A/P) 47, Accounts Receivable (A/R) 48, and Finance 49. In one embodiment, five levels may be provisioned in the hierarchy (excluding the root), and in this embodiment two additional levels may be provided. In this regard, any number of levels may be provided.

As shown, the hierarchy defined by the customer may be based upon multiple criteria. In this case, the hierarchy contains nodes based upon geographical distinction and upon corporate structure. However, the needs of some companies may best be served by constructing a hierarchy based solely on geographical location. For instance, ABC Co. may construct a hierarchy based solely upon the geographical location of the company's offices, wherein the hierarchy contains a state level, a city level, and an office level (in case the company has more than one office in a given city). On the other hand, ABC Co. may construct a hierarchy based solely on the company's corporate structure, wherein the hierarchy contains a department level, division level, and unit level. In practice, it may be more probable that a company would implement a combination of the two approaches, as shown in FIG. 2. Alternatively, a hierarchy may be constructed based upon criteria not shown herein, for example, class of service, product, employee, etc.

Figure 3:
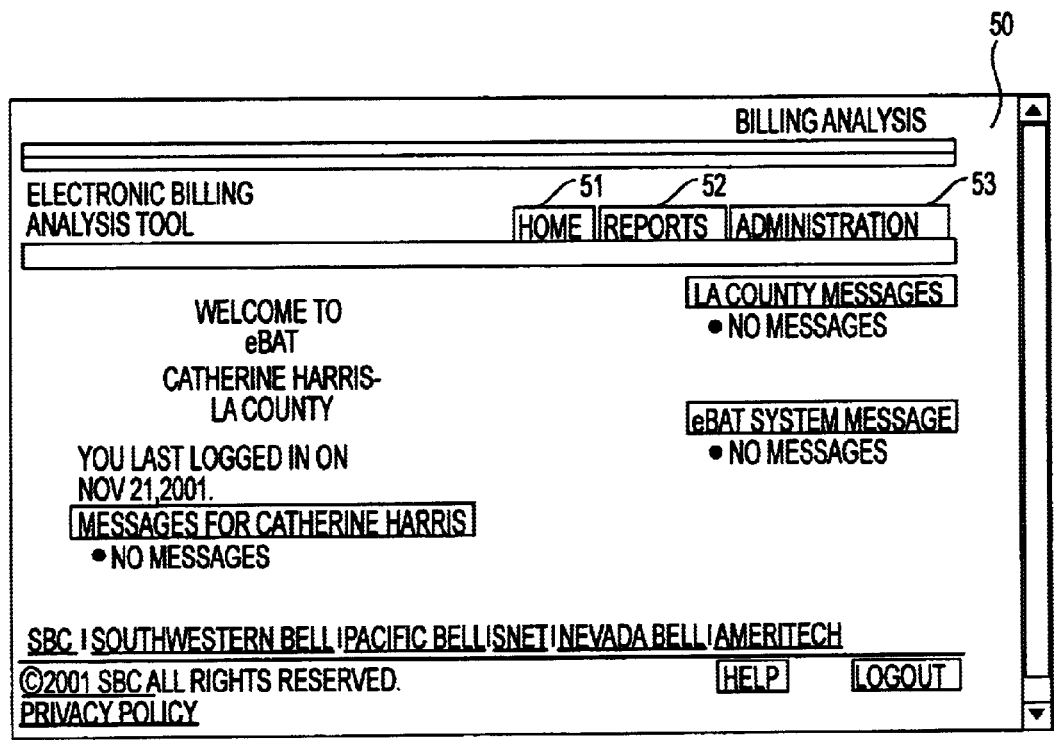
FIG. 3 shows an exemplary web page displayed to the customer after successfully logging on to the eBAT.

FIG. 3 illustrates an exemplary web page displayed to the customer after successfully logging on to the eBAT. An interface 50 contains three navigational tabs permitting various functions to be performed by the customer. A home tab 51, which is active in FIG. 3, displays the interface allowing the user to retrieve eBAT system messages and other messages directed to either the user logged onto the system or general messages pertaining to the customer's account. Reports and billing information may be displayed to the customer by selecting a reports tab 52, to make that tab active. An administration tab 53 that may be similarly activated permits account setup and maintenance functions related to the customer's account.

Typically, each customer designates at least one agent or administrator to be responsible for the administration of the customer's CB or eBAT configuration. The administration generally entails working with the telecommunications carrier to initially provision the service, updating the service information as necessary, and, if applicable, establishing permissions that govern access to the billing data.

Figure 4:
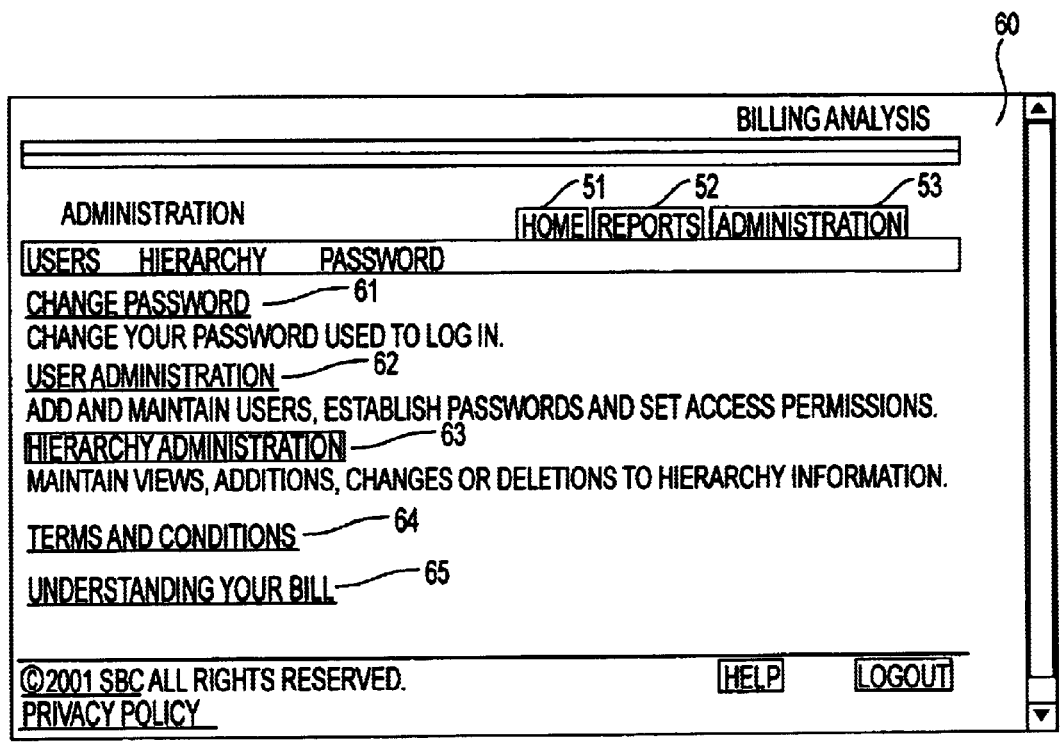
FIG. 4 shows an exemplary eBAT web page displayed to a customer when the administration tab is active.

FIG. 4 illustrates an exemplary web page displayed to a customer when the administration tab is active. An interface 60 contains a change password hyperlink 61 that directs the customer to a web page (not shown) to change their initial login password. The change password web page prompts the customer for their current password followed by their new password. A user administration hyperlink 62 directs the customer to a web page (not shown) to add users, maintain users, establish passwords, and set access permissions. A hierarchy administration hyperlink 63 directs the customer to a web page to view, add, change, or delete portions of the hierarchy. A terms and conditions hyperlink 64 and an understanding your bill hyperlink 65 are also provided, the functions of which are self-explanatory.

With respect to the user administration hyperlink 62 the customer may provision security measures to protect the data, such as configuring permissions to grant or deny access to portions of billing information by certain persons or entities. Read and/or write restrictions may be enabled to restrict access to information down to any level of the hierarchy. For instance, an administrator acting on behalf of the customer may restrict personnel in the marketing department from viewing or updating any of the billing information pertaining to the accounting department. Likewise, east region personnel may be prohibited from viewing or updating information pertaining to west region billing information.

Permissions may also be set at the employee level. For instance, a permission may be set to restrict employee Jane Doe from viewing or updating billing information unrelated to her department. Essentially, the security provisions may be established at any level of the hierarchy created by the customer.

Figure 5:
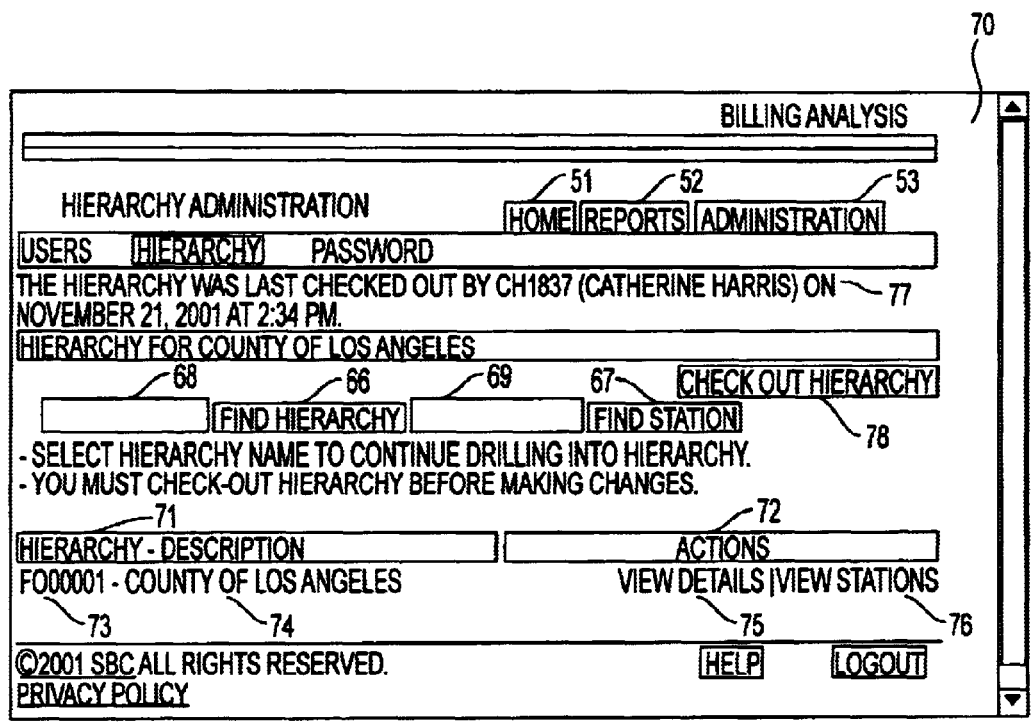
FIG. 5 shows an exemplary eBAT web page displayed to a customer when the hierarchy administration hyperlink is selected.

FIG. 5 illustrates an exemplary web page displayed to a customer when the hierarchy administration hyperlink is selected. An interface 70 includes a hierarchy description column 71 and an actions column 72. The hierarchy description column 71 includes a hierarchy name and a hierarchy description, i.e., labels defined by the customer in the customer's own words. In this instance, the hierarchy name 73 comprises a alpha-numeric identifier (i.e., FO00001) and the hierarchy identifier 74 comprises a name (i.e., County of Los Angeles). At any stage of the hierarchy, the hierarchy name (e.g., FO00001) may be selected to display the child nodes in the hierarchy, as will be discussed with respect to FIGS. 6 and 7. The hierarchy name 73 and hierarchy description 74 are designated by the customer and may include any suitable style. The actions column 72 includes a view details function 75 and a view stations function 76, as will be discussed with respect to FIGS. 8 and 9.

Referring to FIG. 5, the interface also includes a status component 77 that provides an indication of when the hierarchy was last checked out. Changes may be made to the customer hierarchy by selecting a check-out hierarchy button 78, as will be discussed below with respect to FIG. 10. When the changes are completed, the customer selects a check-in hierarchy button (not shown in FIG. 5). While a hierarchy is checked out, the hierarchy is available to other users on a read only basis. Once the hierarchy is checked in, it then may be checked out by other users authorized to make updates to the hierarchy. A find hierarchy search button 66 and a find station search button 67 are provided to quickly locate a specific portion of the hierarchy. The search buttons 66, 67 are utilized by entering a hierarchy name or station in respective text boxes 68, 69.

Figure 6:
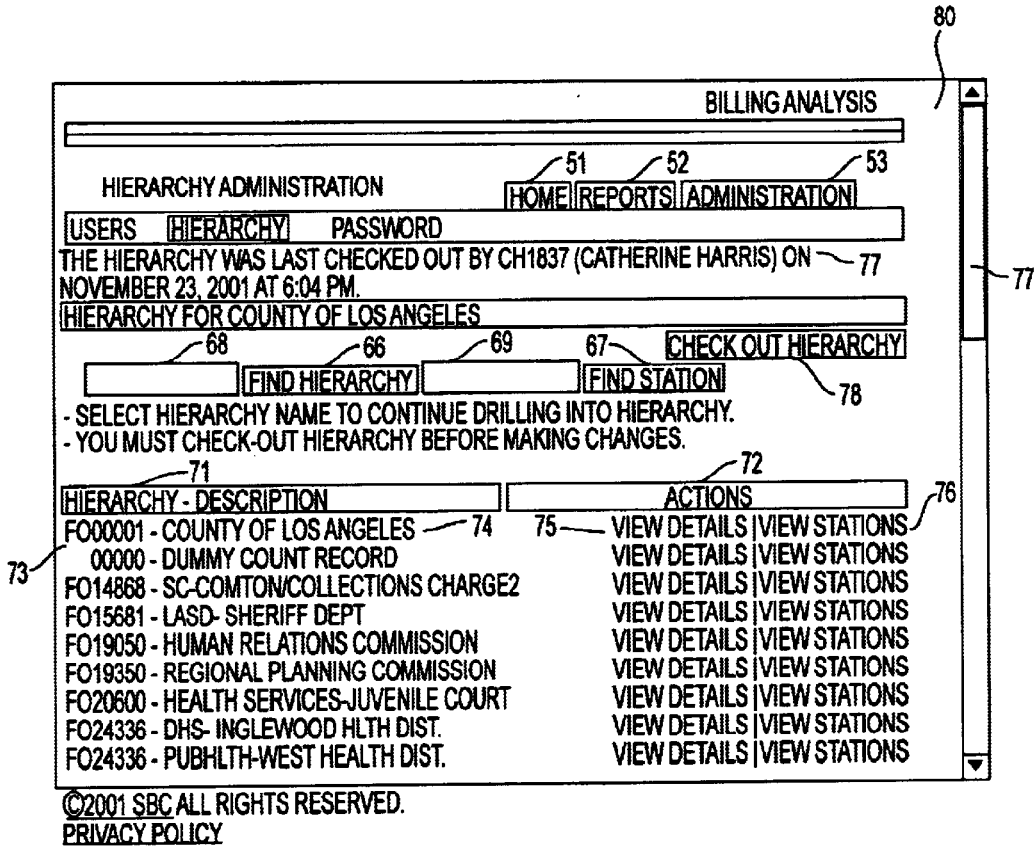
FIG. 6 shows an exemplary eBAT web page displayed to a customer when the hierarchy name of the root node is selected to display the additional nodes in the hierarchy.

FIG. 6 illustrates an exemplary web page displayed to a customer when the hierarchy name of the root node is selected to display child nodes in the hierarchy. An interface 80 includes the hierarchy description column 71 that provides all of the nodes below the parent node in the hierarchy. Specifically, the child nodes below the County of Los Angeles include FO14868 SC-Compton/collections charge2, FO15681 LASD-Sheriff Dept., FO19050 Human Relations Commission, FO19350 Regional Planning Commission, FO20600 Health Services-Juvenile Court, FO24336 DHS-Inglewood Hlth. Dist., FO24366 Pubhlth-West Health Dist., etc. Additionally, the actions column 72 provides view details 75 and view stations 76 functions for each of the nodes displayed. A scroll bar 77 may be used to view additional nodes, which extend beyond the purview of the screen.

Figure 7:
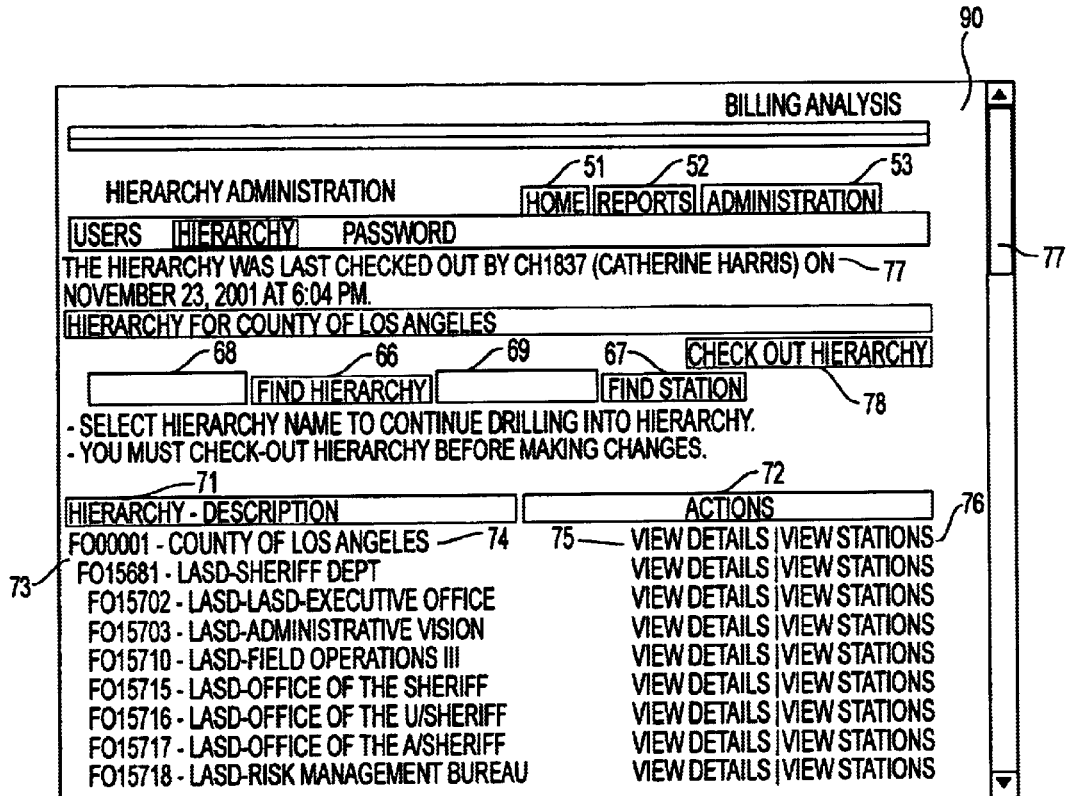
FIG. 7 shows an exemplary eBAT web page displayed to a customer when the hierarchy name of a root node of a subtree is selected to display the additional nodes in the hierarchy.

FIG. 7 illustrates an exemplary web page displayed to a customer when the hierarchy name of a root node of a subtree is selected to display the additional nodes in the hierarchy. An interface 90 includes the hierarchy description column that displays the root node, the root of the subtree, as well as all of the nodes in the subtree. That is, the root node is the County of Los Angeles and the root of the subtree is the LASD-Sheriff Dept. Accordingly, all of the other nodes shown (e.g., LASD-Field Operations III) is a child node of the LASD-Sheriff Dept., which in turn is a child node of the County of Los Angeles. As discussed previously, the actions column 72 provides the view details 75 and the view stations 76 functions for each of the nodes displayed. Again, the scroll bar 77 may be used to view additional nodes, which extend beyond the purview of the screen.

Figure 8:
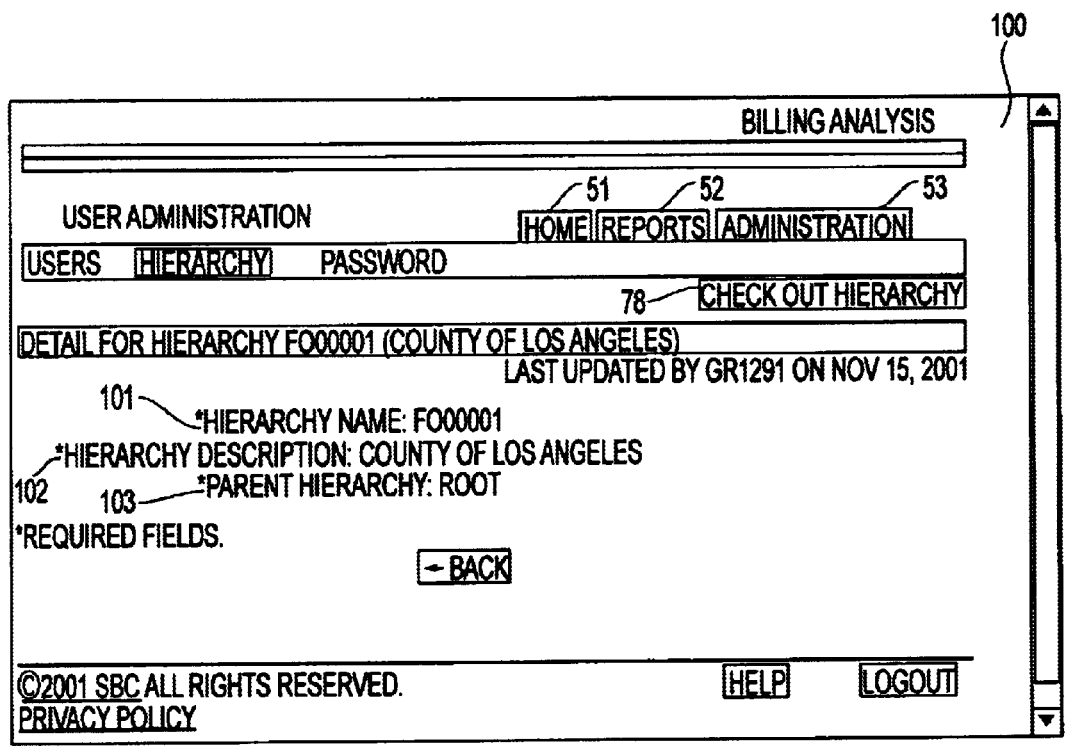
FIG. 8 shows an exemplary eBAT web page displayed to a customer when the view details function is selected.

FIG. 8 illustrates an exemplary web page displayed to a customer when the view details 75 function is selected. An interface 100 includes an identification of the hierarchy name 101, hierarchy description 102 and parent hierarchy 103. The hierarchy name and hierarchy description elements have been discussed previously with respect to FIG. 5. The parent hierarchy 103 is an identification of the parent node in the hierarchy. In this case, the County of Los Angeles is the root so that the root and the parent are one and the same.

Figure 9:
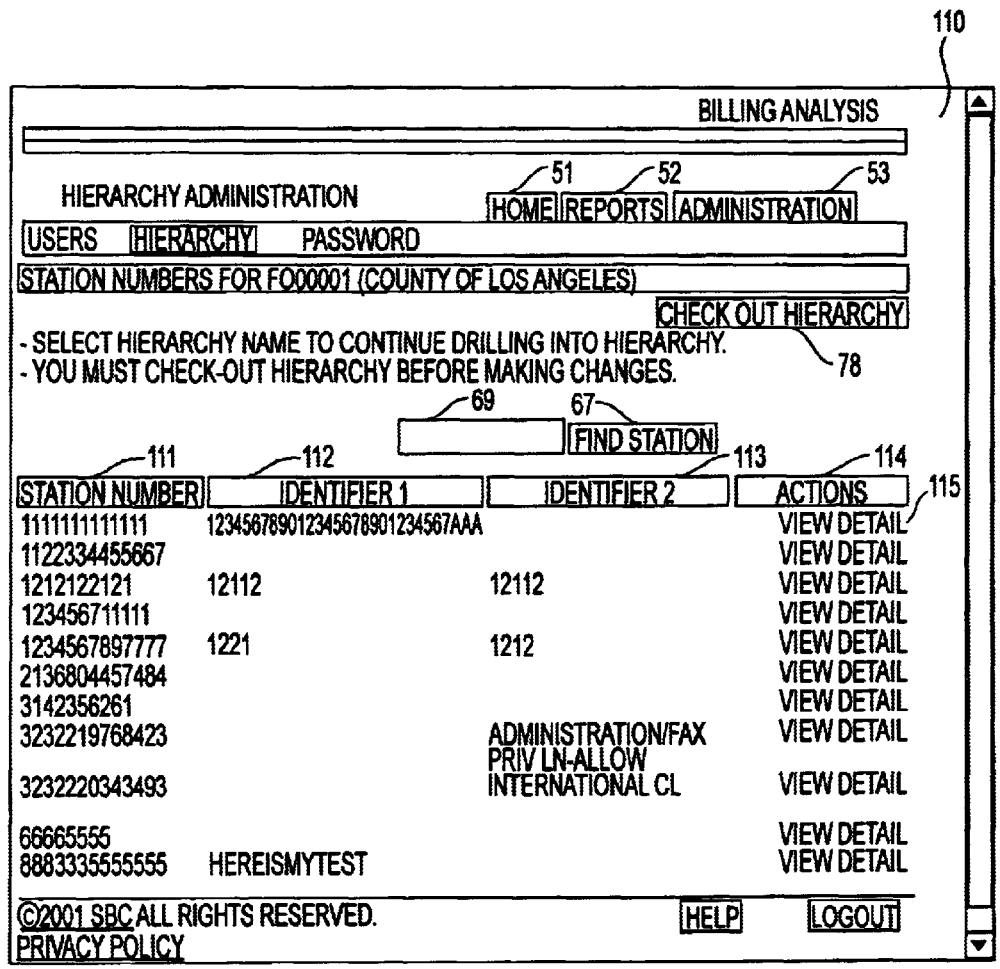
FIG. 9 shows an exemplary eBAT web page displayed to a customer when the view stations function is selected.

FIG. 9 illustrates an exemplary web page displayed to a customer when the view stations 76 function is selected. An interface 110 includes a station number column 111, an identifier 1 column 112, an identifier 2 column 113, and an actions column 114. The station number column 111 may include the BTN or BAN of all of the stations in the hierarchy node currently displayed. The identifier 1 column 112 and the identifier 2 column 113 further identify the stations numbers, e.g. fax line, international line, etc., if so provisioned by the customer. The actions column 114 contains a view detail 115 function, which is identical to the view details 75 function of FIG. 5.

Figure 10:
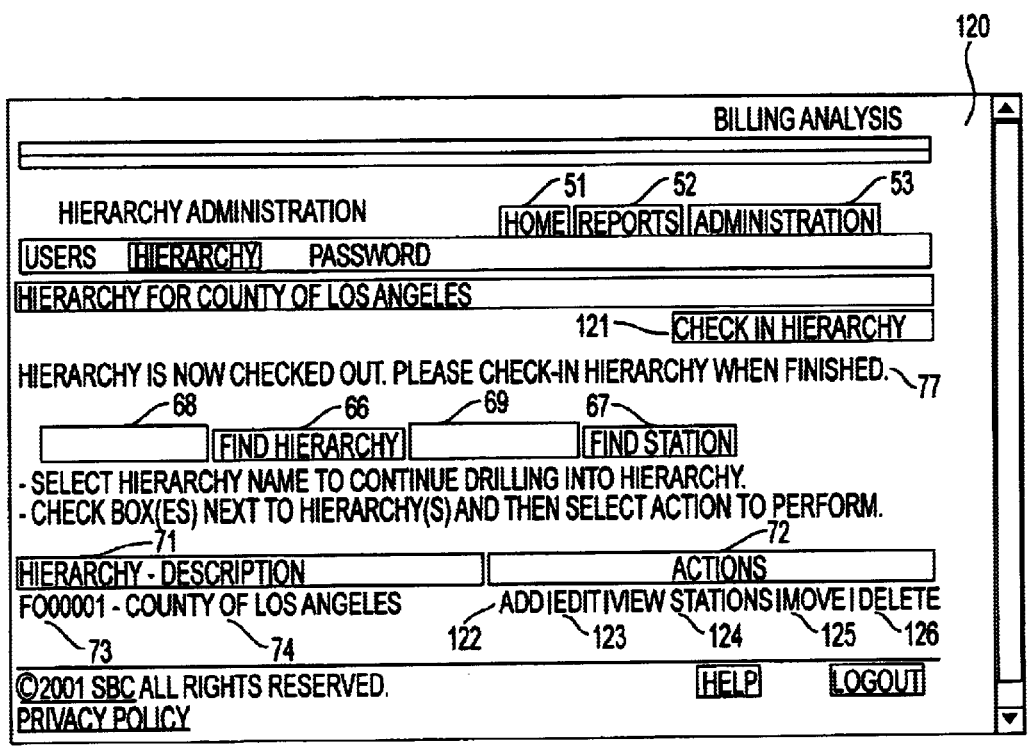
FIG. 10 shows an exemplary eBAT web page displayed to a customer when the hierarchy is checked out.

FIG. 10 illustrates an exemplary web page displayed to a customer when the hierarchy is checked out. An interface 120 provides the hierarchy description column 72 that includes the hierarchy name 73 and the hierarchy description 74, as discussed previously. A message in the status component 77 on the interface indicates that the hierarchy has been checked out and reminds the user to check the hierarchy in when finished using a check-in hierarchy button 121. The actions column 72 of a checked out hierarchy includes an add 122 function, an edit 123 function, a view stations 124 function, a move 125 function, and a delete 126 function. Having been previously discussed, the view stations 124 function will not be addressed since the function thereof is identical to the view stations button 76. The add 122 function, the edit 123 function, the move 125 function, and the delete 126 function are used by the customer to update or modify the hierarchy in the event that changes are necessary.

FIG. 11 illustrates an exemplary web page displayed to a customer when the hierarchy name of the root node is selected to display child nodes in the hierarchy, when the hierarchy is checked out. An interface 130 is provided for selecting a node in the hierarchy, the selection is accomplished by selecting the box adjacent to the hierarchy name and description. To add a node in the hierarchy under hierarchy name 131 FO15681, hierarchy description 132 LASD sheriff dept., adjacent box 133 is selected and then the corresponding add function 134 in the actions column 72 is selected. As a result, the customer is directed to another web page that will be discussed with reference to FIG. 12.

Figure 12:
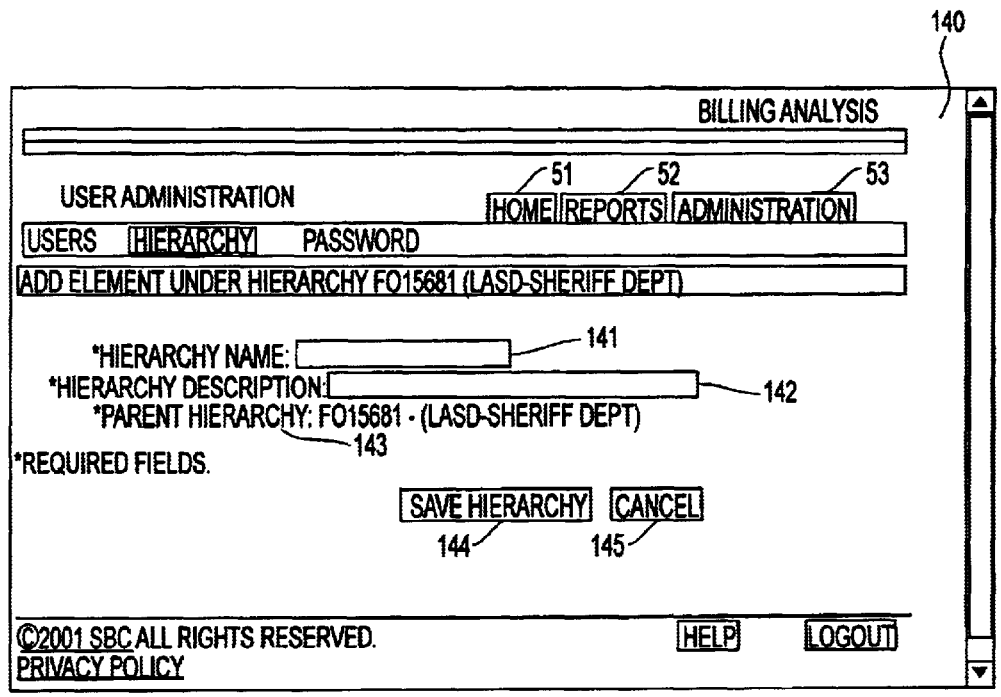
FIG. 12 shows an exemplary eBAT web page displayed to a customer when adding a node in the hierarchy.

FIG. 12 illustrates an exemplary web page displayed to a customer when adding a node in the hierarchy. An interface 140 prompts the customer to enter a new hierarchy name in a text box 141 and a new hierarchy description in a text box 142 of the new node in the hierarchy. Additionally, the parent node in the hierarchy 143 is displayed. If a delete function had been selected by the customer in FIG. 11, a text message would have prompted the customer as to whether they are certain that they want the particular hierarchal element deleted. In response, the customer would be able to accept or cancel the delete command. After additions have been made, the user may select a save hierarchy button 144 or cancel button 145, depending upon the result desired.

Figure 13:
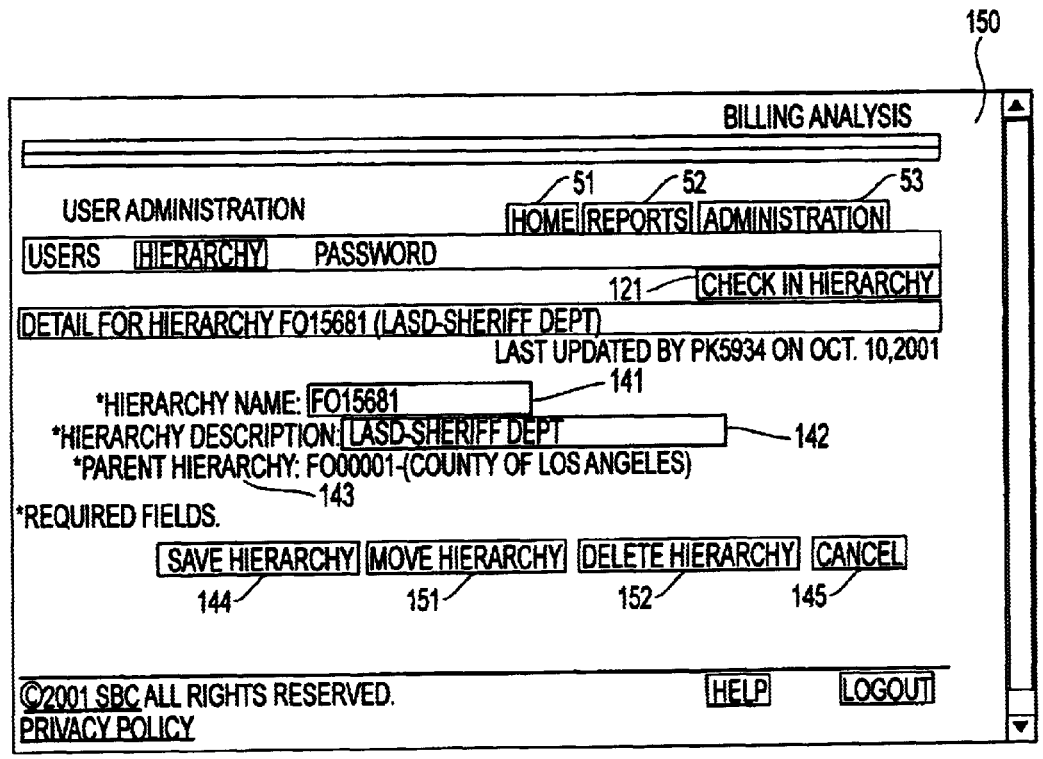
FIG. 13 shows an exemplary eBAT web page displayed to a customer when editing a node in the hierarchy.

FIG. 13 illustrates an exemplary web page displayed to a customer when editing a node in the hierarchy. An interface 150 is provided with the hierarchy text box 141, the hierarchy description text box 142, and the parent hierarchy 143. Modifications and updates to the hierarchy name and the hierarchy description may be made by deleting the current information in the text boxes 141, 142 and typing the new hierarchy name and/or hierarchy description in the text boxes 141, 142. Of course, the modifications and updates may alternatively be made by typing over the current name and/or description, rather than by deleting the current information and then typing the new information. After all of the modifications and updates have been made, the user may select the save hierarchy button 144. Thereafter, the user may select the check-in hierarchy button 121, at which point a notification screen will be displayed indicating that the hierarchy has been checked in. A move hierarchy button 151 and delete hierarchy button 152 are provided to so that the user may perform those respective functions.

Figure 14:
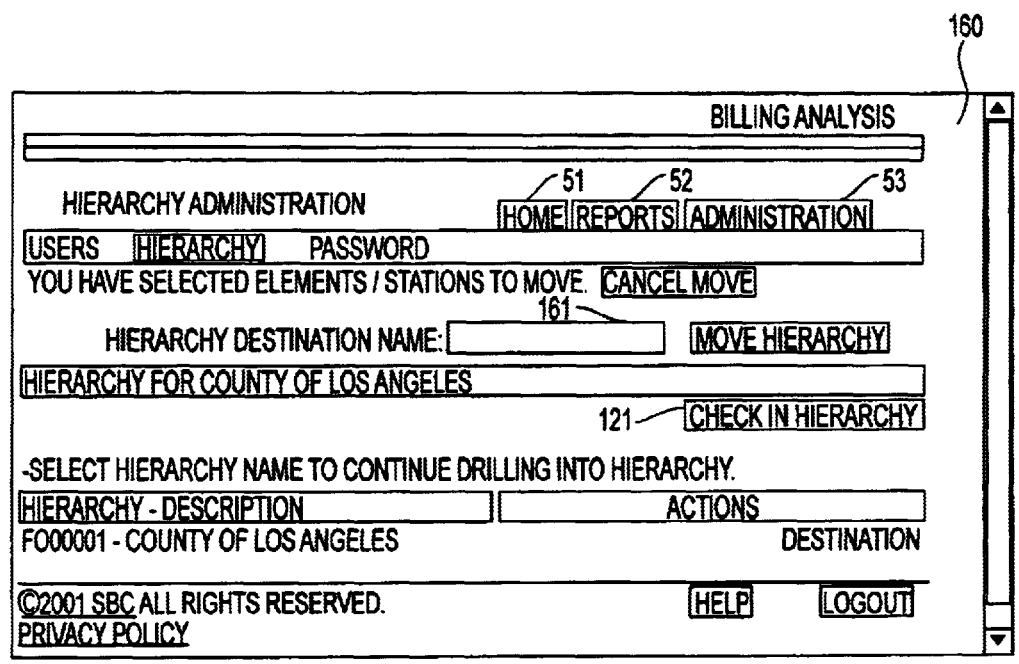
FIG. 14 shows an exemplary eBAT web page displayed to a customer when moving an element in the hierarchy.

FIG. 14 illustrates an exemplary web page displayed to a customer when moving an element in the hierarchy. An interface 160 is provided permitting the customer to perform move functions. When selecting a move function, for instance from FIG. 11, the interface of FIG. 14 prompts the customer to enter a hierarchy destination name in a text box 161 to which the chosen hierarchal element will be moved as a child node. In another embodiment (not shown), Java drag and drop operations are supported to enable customers to move elements within the hierarchy. After all of the moves have been made, the user may select the check-in hierarchy button 121, at which point a message will be displayed in message component 77 indicating that the hierarchy has been checked in.

If the reports tab 52 is selected, the customer may select from a variety of billing reports to be displayed, as will be discussed with respect to FIG. 15. It is possible for the customer to provision their own custom internal reports, in addition to the standard reports provided by eBAT. In this case, the customer may choose between custom and standard reports when selecting the reports tab.

Figure 15:
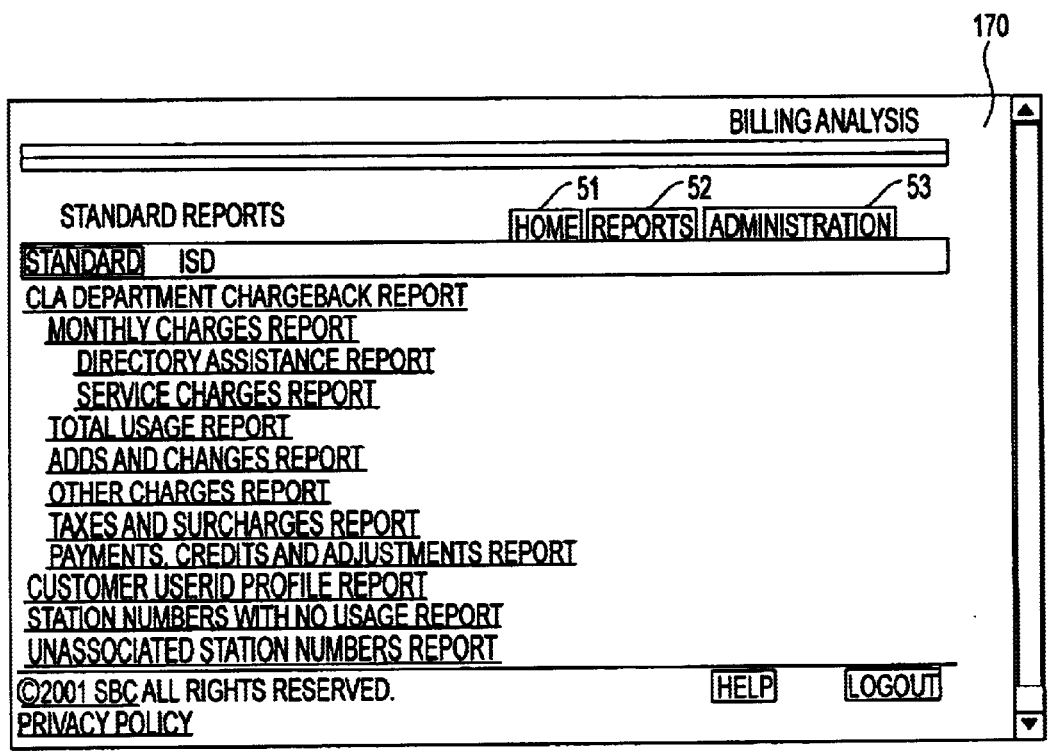
FIG. 15 shows an exemplary eBAT web page displayed to a customer when the reports tab is selected.

FIG. 15 illustrates an exemplary web page displayed to a customer that selected the reports tab. The standard reports allow customers to view billing information for products and services purchased from or billed by the telecommunications carrier and its affiliates.

Examples of various canned reports available through the eBAT include a bill at a glance report, a chargeback report, a monthly charges report, a directory assistance report, a service charges report, a total usage report, an adds and changes report, an other charges report, a taxes and surcharges report, a payments, credits and adjustments report, a customer userid profile report, a station numbers with no usage report, and an unassociated station numbers report. For the sake of brevity, an exhaustive description of each of the various types of reports is not provided herein.

Figure 16:
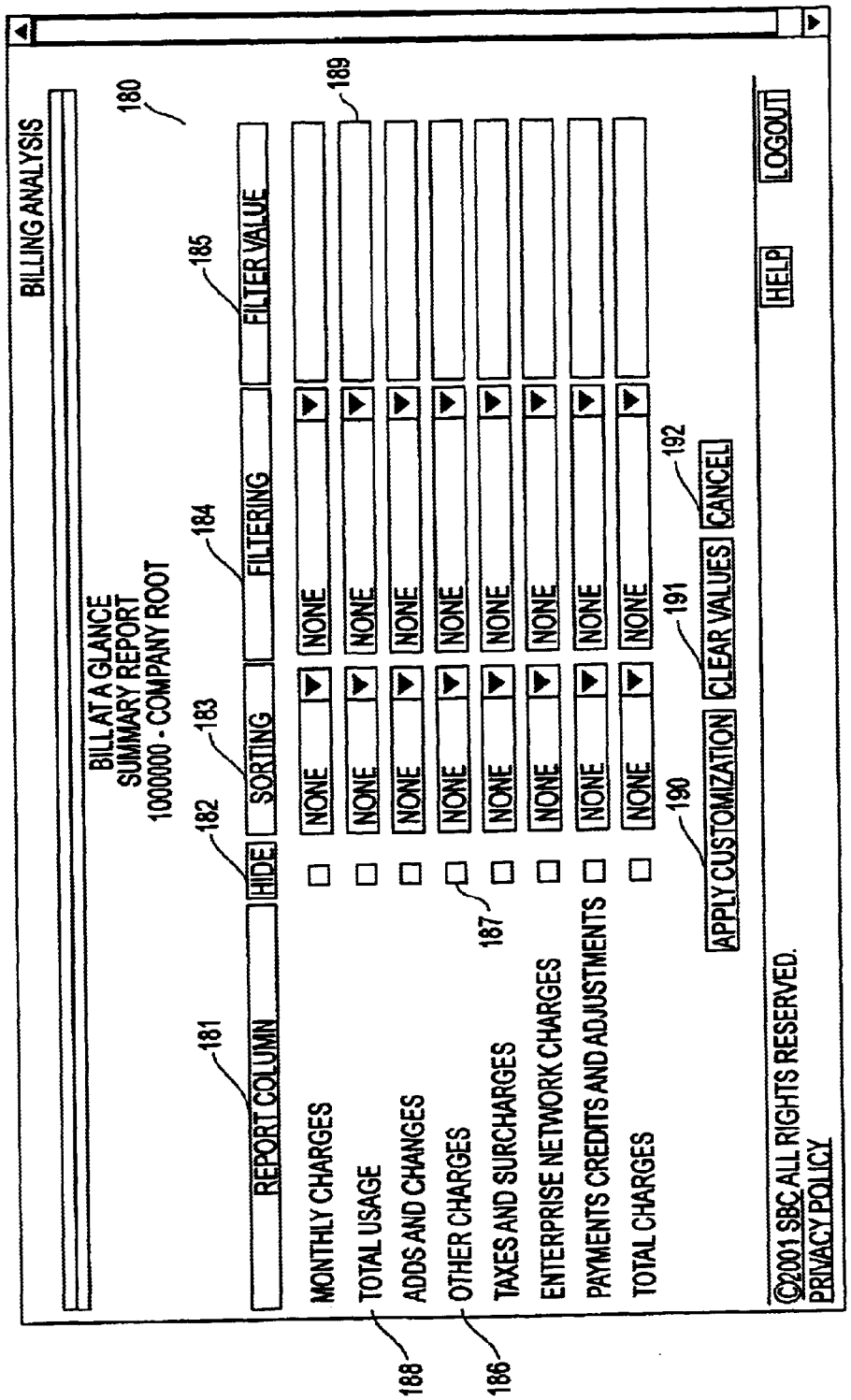
FIG. 16 shows an exemplary bill at a glance setup custom report eBAT web page.

FIG. 16 illustrates an exemplary bill at a glance setup custom report web page of the eBAT. A bill at a glance setup interface 180 is used by the customer to determine the nature of the display of the billing data. That is, a report column 181, a hide column 182, a sorting column 183, a filtering column 184, and a filter value column 185 are used by the customer to indicate which columns the user wants displayed, how the data is to be sorted, and how the data is to be filtered.

The report column 181 recites the available columns that may be displayed in a bill at a glance report. Each column comprises a field of data, e.g., monthly charges, total usage, etc. Any columns that the user desires to be omitted from the bill at a glance report may be marked by the user in the corresponding hide column to the right. For instance, the other charges field may be hidden from the bill at a glance report by selecting hide column box 187 to the right of the other charges field 186. A check mark in the hide column box toggles the hide feature to ON.

The sorting column 183 contains drop down menus for each of the fields in the report column 181. The data for each of the fields may be sorted according, for example, to date or amount, in either ascending or descending order.

The filtering column 184 contains drop down menus for each of the fields in the report column 181. The data for each of the fields may be sorted by, for example, amount or by location. For instance, the filtering feature may be used to view billing records only in excess of $1000.00 or only originating for a particular location, e.g. St. Louis. To utilize the filtering feature, a value is entered in the filter value column 185 corresponding to the item in the reporting column that the user wants the filter applied. For instance, to view total usage 188 charges for St. Louis only, the customer would type in St. Louis in filter value text box 189 corresponding to the total usage 188 field.

After entering the desired criteria, the user may select an apply customization button 190 to display the bill at a glance data on a separate screen that will automatically be displayed thereafter. A clear values button 191 and a cancel button 192 are also provided to perform the indicated functions.

Once the customer indicates how the data is to be sorted and filtered, the customer's preferences may be saved. Thus, the following month's report will automatically load according to the customer's saved sorting and filtering preferences.

FIG. 17 illustrates an exemplary bill at a glance web page of the eBAT system. A bill at a glance interface 200 includes a bill date column 201 and hierarchy name column 202, in addition to the columns specified to be displayed at the bill at a glance setup page, i.e., monthly service charges column 203, total usage column 204, adds and changes column 205, other charges column 206, taxes and surcharges column 207, directory assistance column 208, payments credits and adjustments column 209, and total charges column 210.

The user may select a customize report button 211 that returns the user to the bill at a glance setup page 180 so that the display can be modified. A download report button 212 is provided to permit the data to be downloaded to any suitable storage medium. A printer version button 213 is provided to send the data to a printer in a print friendly format. Drop down menus 214, 215 are provided so that a user may jump to a particular day in a given billing cycle. For example, a user may enter Oct. 24, 2000, in the drop down menus so that data for only that day is displayed. Up arrows 216 and down arrows 217 located in the heading of columns 203, 204, 205, 206, 207, 208, 209, or 210 permit the user to view data in ascending or descending order, respectively.

The bill at a glance interface 200 also serves as a gateway to the various reports discussed with respect to FIG. 15. That is, the charges in the monthly service charges column 203, the total usage column 204, the adds and changes column 205, the other charges column 206, the taxes and surcharges column 207, the directory assistance column 208, the payments credits and adjustments column 209, and the total charges column 210 are hyperlinked. As a result, selecting any of the charges in the columns 203, 204, 205, 206, 207, 208, 209, or 210 navigates the user to a report associated with the particular type of charge selected by the user. For instance, to display a report showing only monthly service charges for July 2000 the user would select a July 2000 $374,576.53 charge 218 in the monthly service charges column 203. Similarly, to display a report showing only directory assistance charges for January 2000, the user would select a January 2000 $30.00 charge 219 in the directory assistance charges column 208.

FIG. 18 is an exemplary monthly service charges web page of the eBAT. An interface 220 shows a monthly service charges report that contains a bill date column 221, a hierarchy name column 222, and a total charges column 223. The hierarchy name column 222 contains the name of the node in the hierarchy. For instance, the hierarchy nodes identified include the root 224, Accounting Department 225, Billing Department 226, HR Department 227, IT Department 228, Legal Department 229, and Marketing Department 230. Each of the hierarchy names are hyperlinked such that selecting one of the names guides the user to the respective child nodes of the hierarchy to view additional billing detail. For instance, selecting the IT Department hierarchy name 228 directs the user to the child nodes of the IT Department, for example, the Desktop Services division. A path bar 231 indicates to the user the point in the hierarchy currently being displayed.

FIG. 19 is an exemplary monthly service detail report web page the eBAT. An interface 240 shows a monthly service detail report for the Desktop Services division of the IT Department, as depicted in the path bar 231. The monthly service detail report contains billing data for each of the telephone lines (i.e., BTNs) within the Desktop Services division of the IT Department. The two telephone lines shown are the 310-547-0282 and the 310-547-0597, both of the Lomita, Calif. location. A scroll bar 241 on the right of the interface permits the user to maneuver to other telephone lines (not shown). A subtotal is provided at the end of each record pertaining to each telephone line. A total is provided at the end of all of the records for all of the telephone lines within the Desktop Services division.

The monthly service detail report includes a provider column 242, a description column 243, a universal service order code (USOC) column 244, an activity date column 245, a rate column 246, a quantity column 247, and a charge column 248. The provider column 242 contains the name (or abbreviation) of the telecommunications provider, e.g., Pacific Bell, Southwestern Bell, etc. The description column 243 contains an identification of the service provided, for instance, 900/976 blocking charges, unpublished number charges, etc. The USOC column 244 contains the code of the service provided, each service having a unique code assigned by the telecommunications provider. The activity date column 245 contains the date on which the service or activity transpired. The rate column 246 contains the unit cost for the service or activity. The quantity column 247 contains the number of each service or activity provided. The charge column 248 contains the charge based upon the rate times the quantity.

FIG. 20 illustrates an exemplary CB account summary excerpt that is not formatted in accordance with a customer hierarchy. The summary 250 includes an account identifier column 251, a BTN column 252, a carrier column 253, a monthly charges column 254, a usage column 255, an other charges and credits column 256, a taxes and surcharges column 257, and a total column 258. The account identifier column 251 includes the company name (e.g., Anheuser Busch) to which the billing information applies. The BTN column 252 contains the billing telephone numbers associated with the billed charges indicated. The carrier column 253 contains the name of the affiliate telecommunications carrier servicing the number in the associated BTN column 252 immediately to the left of the carrier.

For example, horizontal row 259 includes $1540.00 of charges associated with BTN 314 235-1234 using services provided by Southwestern Bell Telephone. The total charges of $1540.00 includes $50.00 of monthly charges, $350.00 of usage charges, $1000.00 of other charges and credits, and $140.00 of taxes and surcharges.

FIG. 21 illustrates an exemplary CB account summary excerpt in accordance with a customer's hierarchy. The summary 260 includes a hierarchy total column 261 in addition to the elements identified in FIG. 20. Elements discussed with respect to FIG. 20 having like numerals will not be discussed again. The hierarchy for the account summary shown in FIG. 21 includes Anheuser Busch as the root node (i.e., level 0). Level 1 of the hierarchy includes Missouri 262 and California 263 state locations. Level 2 of the hierarchy includes St. Louis 264 and San Ramon 265 city locations. Level 3 of the hierarchy includes brewing 266 and distribution 267 company departments. Level 4 of the hierarchy includes speciality beers 268 and regular beer 269 divisions. Level 5 of the hierarchy includes Crow 270, Holder 271, Kemp 272, etc., brands.

Each of the brands has previously been assigned to a BTN by the customer, which has been provisioned in a company hierarchy. The hierarchy total column 261 provides the total charges for each element in the hierarchy.

As shown, the St. Louis 264 location has total charges of $30,365.50, including $25,509.00 for the brewing department and $4856.50 for the distribution department. Similarly the $17,803.50 for the St. Louis specialty beers division includes $10,109.00 for Crow and $7,694,50 for Holder. The Crow BTNs are identified as 314 235-1234 and 314 235-1237. Carriers for the Crow BTNs are Southwestern Bell Long Distance for calls to locations outside of the local service area of the BTN (i.e., toll calls) and Southwestern Bell Telephone for calls within the local service area of the BTN (i.e., local calls).

For instance, horizontal row 280 includes $1540.00 of charges associated with BTN 314 235-1234. The total charges of $1540.00 comprises $50.00 of monthly charges, $350.00 of usage charges, $1000.00 of other charges and credits, and $140.00 of taxes and surcharges.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor, including switches, etc. Dedicated hardware implementations including, but not limited to, application specific integrated circuits, programmable logic arrays and other hardware devices can likewise be constructed to implement the methods described herein. It should also be noted that the software implementations of the present invention can be stored on a tangible storage medium such as a magnetic or optical disk, read-only memory or random access memory and can be produced as an article of manufacture.

Although the present specification describes components and functions implemented in the embodiments with reference to particular standards and protocols, the invention is not limited to such standards and protocols. Such standards are periodically superseded by faster or more efficient equivalents having essentially the same functions. Accordingly, replacement standards and protocols having the same functions are considered equivalents.

What is claimed is:

1. In a telecommunications billing system, a method of providing billing information to a customer in accordance with a custom-defined format, the method comprising:

assigning telephone numbers to company units;

defining how each of the company units relate to each other in a hierarchy;

receiving billing data from at least one service provider at a billing repository;

storing the received billing data with associated information indicating that the customer desires presentation of the billing information via a web-based billing application;

storing the hierarchy on a server, the server extracting billing data from the billing repository and formatting the billing data in accordance with the hierarchy, the formatting including processing the billing data associated with each telephone number in accordance with the hierarchy; and presenting the processed billing information to the customer in accordance with the associated information, the processed billing information presented to the customer via a graphical user interface comprising a billing screen including a plurality of columnized charges listed under respective column headings and arrange according to a type of charge, such that selection by the customer of a charge in a particular column causes a report to be displayed to the customer showing detailed charges that comprise the selected charge.

2. The method according to claim 1, wherein the hierarchy is organized according to corporate structure and/or geographical location of the company units.

3. The method according to claim 1, wherein the customer-defined format comprises customer-defined labels.

4. The method according to claim 1, wherein the billing information is presented to the customer in accordance with a billing period defined by the customer.

5. In a telecommunications billing system, method of providing a bill in accordance with a customer-defined format, the method comprising:

receiving billing information from at least one service provider at a billing repository;

retrieving the billing information from the billing repository, the billing information including associated information indicating that a customer desires a paper copy of the bill;

processing the retrieved billing information at a server in accordance with the customer-defined format stored on the server, the customer-defined format comprising a hierarchy;

sending the processed billing information to an outputting operation where a bill is generated in accordance with the hierarchy; and sending the bill to a customer, in accordance with the associated information, wherein the bill comprises an account summary including a hierarchy total column, a monthly charges column, a usage column, an other charges and credits column, a taxes and surcharges column, and a total column.

6. The method according to claim 5, wherein the hierarchy is organized according to corporate structure and/or geographical location of the company units.

7. The method according to claim 5, wherein the customer-defined format further comprises customer-defined labels.

8. The method according to claim 5, wherein the billing information is sent to the customer in accordance with a billing period defined by the customer.

9. In an electronic billing system, a method of enabling a customer to create a hierarchal structure to support internal company criteria, the method comprising:

enabling the customer to assign telephone numbers to company units;

enabling the customer to define how each of the company units relate to each other in a hierarchy;

storing the hierarchy on a server, the server receiving billing data and associated information indicating that the customer desires presentation of billing information via a web-based billing application, from a billing repository and formatting the billing data in accordance with the hierarchy;

enabling the customer to view the billing information associated with selected portions of the hierarchy, in accordance with the associated information;

enabling the customer to update the assignments of telephone numbers, the updating comprising moving the telephone numbers within the hierarchy using Java drag and drop operations;

enabling the customer to update the definition of how each of the company units relate to each other in the hierarchy, the updating comprising moving the company units within the hierarchy using Java drag and drop operations;

enabling a representative of the customer to check out the hierarchy, at which time the hierarchy is available to other representatives of the customer on a read only basis; and prompting the representative of the customer to check in the hierarchy.

10. The method according to claim 9, wherein a company unit displayed in the viewed billing information contains a hyperlink to billing information associated with a child node in the hierarchy.

11. The method according to claim 9, wherein a charge displayed in a column of a summary billing report contains a hyperlink to a detailed billing report associated with the charge.

12. The method according to claim 9, wherein the hierarchy is organized according to corporate structure and/or geographical location of the company units.

13. The method according to claim 9, further comprising allowing the customer to set permissions that determine access rights to billing information.

14. The method according to claim 13, wherein a permission is set to determine access to a specific level of the hierarchy.

15. The method according to claim 9, wherein the hierarchal structure comprises a customer-defined format comprising customer-defined labels.

16. In an electronic billing system, a method of creating a hierarchal structure to support a customer's internal company criteria, the method comprising:

assigning telephone numbers to company units according to the customer's internal company criteria;

defining how each of the company units relate to each other in a hierarchy in accordance with the customer's request;

storing the hierarchy on a server, the server receiving billing data and associated information indicating that a customer desires presentation of billing information via a web-based billing application, from a billing repository and formatting the billing data in accordance with the hierarchy, the billing repository having received the billing data from at least one service provider;

enabling the customer to view the billing information associated with selected portions of the hierarchy, in accordance with the associated information;

enabling the customer to update the assignments of telephone numbers, the updating comprising moving the telephone numbers within the hierarch using Java drag and drop operations;

enabling the customer to update the definition of how each of the company units relate to each other in the hierarchy, the updating comprising moving the company units within the hierarchy using Java drag and drop operations;

enabling a representative of the customer to check out the hierarchy, at which time the hierarchy is available to other representatives of the customer on a road only basis; and prompting the representative of the customer to check in the hierarchy.

17. The method according to claim 16, wherein a company unit displayed in the viewed billing information contains a hyperlink to billing information associated with a child node in the hierarchy.

18. The method according to claim 16, wherein a charge displayed in a column of a summary billing report contains a hyperlink to a detailed billing report associated with the charge.

19. The method according to claim 16, wherein the hierarchy is organized according to corporate structure and/ or geographical location of the company units.

20. The method according to claim 16, further comprising allowing the customer to set permissions that determine access rights to billing information.

21. The method according to claim 20, wherein a permission is set to determine access to a specific level of the hierarchy.

22. The method according to claim 16, wherein the hierarchal structure comprises a customer-defined format comprising customer-defined labels.

23. A system for creating a billing statement according to a customer-defined hierarchal structure, the system comprising:

a server that stores a customer hierarchy and receives billing information and associated information, indicating that a customer desires to receive presentation of the billing statement via a web-based billing application, from a billing repository and formats the billing information, the billing repository having received the billing data from at least one service provider, the hierarchy comprising an assignment of telephone numbers to company units and an indication of how each of the company units relate to each other;

a processor that processes billing information associated with each assigned telephone number in accordance with the hierarchy; and a presenter that presents the processed billing statement to the customer in accordance with the associated information, the processed billing information presented to the customer via a graphical user interface comprising a billing screen including a plurality of columnized charges listed under respective column heading and arranged according to a type of charge, such that selection by the customer of a charge in a particular column causes a report to be displayed to the customer showing detailed charges that comprise the selected charge.

24. The system according to claim 23, wherein the server receives and stores updated hierarchal information from the customer.

25. The system according to claim 24, wherein the updating of the hierarchal information does not affect upstream billing systems.

26. The system according to claim 23, wherein the server receives and stores permissions from the customer that determine access rights to billing information.

27. The system according to claim 23, wherein the customer-defined hierarchal structure comprises a customer-defined format comprising customer-defined labels.

28. A computer readable medium storing a computer program that displays electronic billing information to a customer, the computer readable medium comprising:

a receiving code segment that receives a hierarchy defined by a customer, the hierarchy comprising an assignment of telephone numbers to company units and an indication of how each of the company units relate to each other;

a storing code segment that stores the hierarchy on a server;

a receiving code segment that receives billing data at the server from a billing repository, including associated information indicating that the customer desires presentation of the electronic billing information via a web-base billing application the billing repository having received the billing data from least one service provider;

a processing code segment that processes the billing data associated with each assigned telephone number in accordance with the hierarchy;

a presenting code segment that presents the billing information to the customer in accordance with the associated information, the billing information presented to the customer via a graphical user interface comprising a billing screen including a plurality of columnized charges listed under respective column heading and arranged according to a type of charge, such that selection by the customer of a charge in a particular column causes a report to be displayed to the customer showing detailed charges that comprise the selected charge;

a first updating code segment that updates the assignments of telephone numbers, the updating comprising moving the telephone numbers within the hierarchy using Java drag and drop operations;

a second updating code segment that updates the indication of how each of the company units relate to each other in the hierarchy, the customer updating the indication of how each of the company units relate to each other in the hierarchy by moving the company units within the hierarchy using Java drag and drop operation;

an accessing code segment that enables a representative of the customer to check out the hierarchy, at which time the hierarchy is available to other representatives of the customer on a read only basis; and a prompting code segment that prompts the representative of the customer to check in the hierarchy.

29. The computer readable medium of claim 28, wherein the hierarchy further comprises a customer-defined format comprising customer-defined labels.

* * * * *

UNITED STATES PATENT AND TRADEMARK OFFICE
CERTIFICATE OF CORRECTION

PATENT NO. : 6,965,668 B2 Page 1 of 1
APPLICATION NO. : 10/038658
DATED : November 15, 2005
INVENTOR(S) : B. Clark et al.

It is certified that error appears in the above-identified patent and that said Letters Patent is hereby corrected as shown below:

At column 15, line 64, "arrange" should be ---arranged---.

At column 17, line 44, "hierarch" should be ---hierarchy---.

At column 17, line 53, "road" should be ---read---.

At column 18, line 31, "heading" should be ---headings---.

At column 19, line 6, "heading" should be ---headings---.

At column 20, line 5 "operation" should be ---operations---.

Signed and Sealed this

First Day of August, 2006

JON W. DUDAS
*Director of the United States Patent and Trademark Office*